(12) United States Patent
Harada

(10) Patent No.: US 6,385,348 B1
(45) Date of Patent: May 7, 2002

(54) PRINTING APPARATUS, INFORMATION PROCESSING APPARATUS, AND METHOD OF CONTROLLING THEM

(75) Inventor: Takuto Harada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/208,978

(22) Filed: Dec. 11, 1998

(30) Foreign Application Priority Data

Dec. 15, 1997 (JP) .............................. 9-345327
Nov. 13, 1998 (JP) ........................... 10-324047

(51) Int. Cl.⁷ .............................................. G06K 9/36
(52) U.S. Cl. ...................... 382/284; 358/450; 358/452
(58) Field of Search ................. 358/448, 450, 358/452, 537, 540; 382/284

(56) References Cited

U.S. PATENT DOCUMENTS

| | | | | |
|---|---|---|---|---|
| 4,949,188 A | 8/1990 | Sato | .......................... | 358/448 |
| 5,032,928 A | * 7/1991 | Sakai et al. | .................. | 358/448 |
| 5,585,945 A | * 12/1996 | Ikeda et al. | .................. | 358/540 |
| 5,592,305 A | * 1/1997 | Iwadate et al. | ............. | 358/448 |
| 5,701,184 A | * 12/1997 | Motoyama | ................... | 358/450 |
| 5,732,161 A | * 3/1998 | Kuroda et al. | .............. | 382/284 |
| 5,745,664 A | * 4/1998 | Nomura et al. | ............. | 382/284 |
| 5,771,108 A | * 6/1998 | Ikeda et al. | .................. | 358/500 |

* cited by examiner

*Primary Examiner*—Thomas D. Lee
(74) *Attorney, Agent, or Firm*—Fitzpatrick, Cella, Harper & Scinto

(57) ABSTRACT

A command for synthesizing an image captured by a scanner (200) is inserted in print data to be transmitted from a host apparatus (201) to a printer (1000), and the printer (1000) executes the command to synthesize the print data and scanner data. In this case, an image captured by the scanner (202) is transferred to the host apparatus (201), and is preview-displayed by the host apparatus (201). Then, the image captured by the scanner is inserted into an image formed based on the print data on a preview display window.

30 Claims, 20 Drawing Sheets

PRINTING APPARATUS, INFORMATION PROCESSING APPARATUS, AND METHOD OF CONTROLLING THEM

BACKGROUND OF THE INVENTION

The present invention relates to a printing apparatus for synthesizing an image scanned via, e.g., a scanner, and an image created based on print data and printing the synthesized data, an information processing apparatus for controlling the printing apparatus, and their control method.

Conventionally, upon printing an image, which contains image data captured by a scanner and print data described in, e.g., PDL (page description language) and transmitted from a host computer, the host computer temporarily captures the image data via the scanner, synthesizes the image data and PDL data, and transmits the synthesized data to a printer to print it.

However, when the scanner and host computer are connected via a network, if the data captured by the scanner has a large size, a heavy load acts on the network. Also, the host computer requires a large-capacity memory for storing image data, and data processing on the host computer requires much time.

SUMMARY OF THE INVENTION

The present invention has been made in consideration of the above problems, and has as its object to provide a printing apparatus for capturing image data in accordance with an instruction included in print data, synthesizing the image data and print data, and outputting the synthesized data, an information processing apparatus for sending print data to the printing apparatus, and their control method.

It is another object of the present invention to provide a printing apparatus which can synthesize print data and scanned image data by a desired synthesis scheme upon reception of print data which includes an instruction pertaining to trimming and the synthesized position of image data to be synthesized with the print data, an information processing apparatus for sending print data to the printing apparatus, and their control method.

In order to achieve the above objects, according to the present invention, print data to be transmitted from a host apparatus to a printer is embedded with a command for synthesizing an image scanned by a scanner, and the printer executes the command to synthesize the print data and scanner data. In this case, an image scanned by the scanner is transferred to the host apparatus to preview-display that image on the host apparatus. On a preview display window, the operator selects a region of the scanned image to be inserted in an image formed by the print data.

Another arrangement for achieving the objects of the present invention is as follows.

That is, there is provided a printing apparatus comprising:

detection means for detecting a command for instructing synthesis between print data and image data from the print data transmitted from an external apparatus;

capture means for capturing image data when the detection means detects the command; and synthesis means for synthesizing the image data captured by the capture means with an image obtained based on the print data.

Alternatively, there is provided an information processing apparatus connected to a printing apparatus which can capture image data via a scanner, comprising:

data transmission means for transmitting print data including a command, which designates an insertion region of image data, to the printing apparatus;

reception means for receiving image data, which is captured by the printing apparatus via the scanner in accordance with the command, from the printing apparatus;

display means for displaying the image data received by the reception means;

image data designation means for designating image data to be inserted into the insertion region, on the basis of the image data displayed by the display means; and transmission means for transmitting a designation result of the image data designation means to the printing apparatus.

Also, there is provided an information processing apparatus, which is connected to a printing apparatus which can capture image data via a scanner, and is capable of creating document data, comprising:

capture means for capturing image data via the scanner via the printing apparatus in accordance with information of an insertion region of image data, which information is contained in document data;

display means for displaying the captured image data;

image data designation means for designating a selection region indicating a region of image data to be inserted in the document data on the basis of the image data displayed by the display means; and print data generation means for generating print data, which contains information of the insertion region and selection region and can be interpreted by the printing apparatus, on the basis of the document data, insertion region, and selection region, and transmitting the print data to the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

[First Embodiment]

The preferred embodiments of the present invention will be explained in detail hereinafter with reference to the accompanying drawings.

Figure 1:
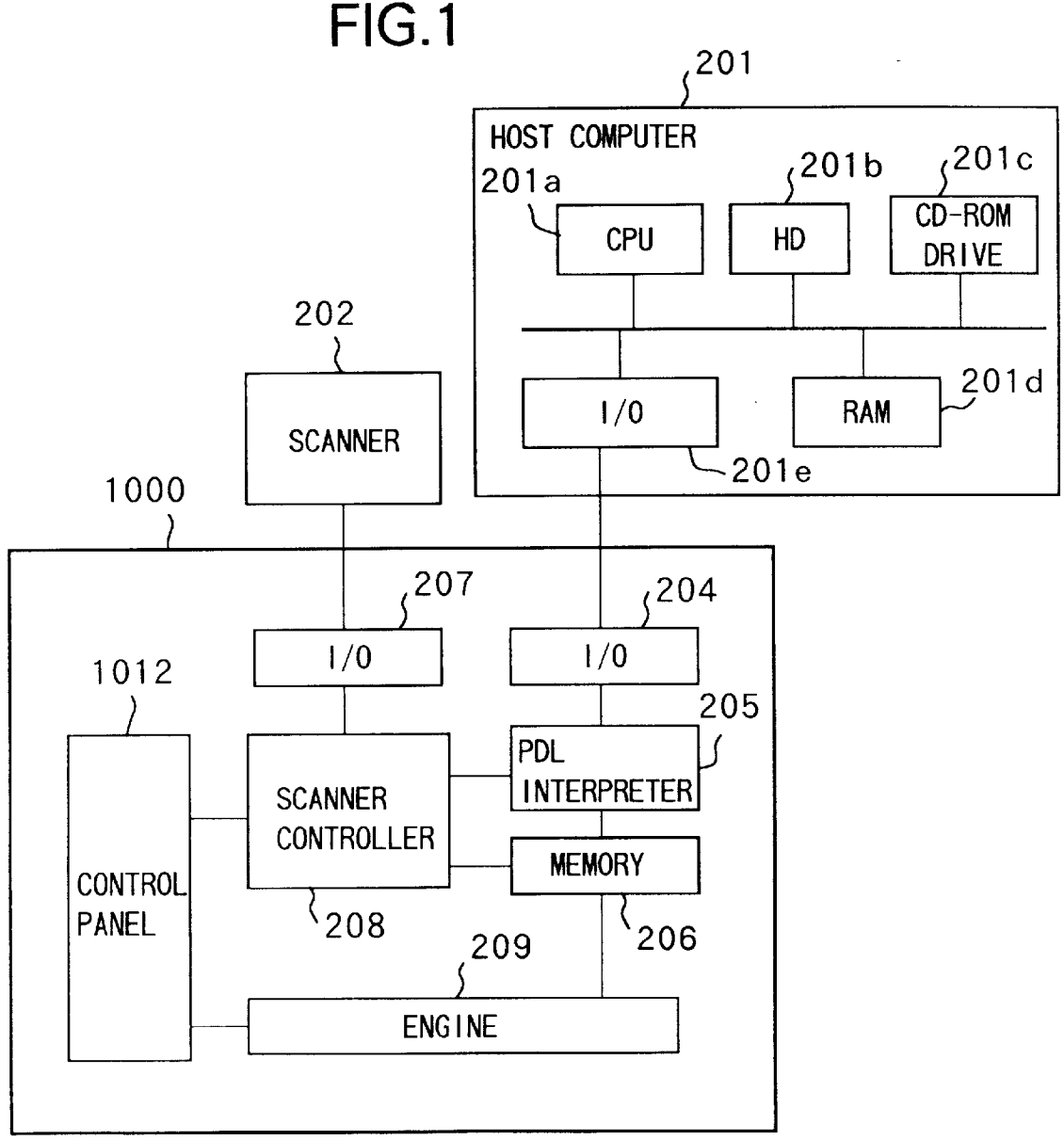
FIG. 1 is a block diagram showing an example of the arrangement of a printing system in the first and second embodiments.

FIG. 1 is a block diagram showing an example of the arrangement of a printing system according to the present invention. In a printer 1000 shown in FIG. 1, an I/O unit 204 receives print data (to be referred to as PDL data hereinafter) described in a page description language from a host computer 201. An I/O unit 207 receives data (to be referred to as scan data or scan image hereinafter) from a scanner 202. A PDL interpreter 205 developes bitmap image data on the basis of PDL data received by the I/O 204. A memory 206 saves the mapped bitmap image data. A scanner controller 208 acquires data from the scanner 202 in accordance with a request from the PDL interpreter 205, and writes it in the memory 206. Various operation setups upon printing can be done on a control panel 1012. Such setups can also be downloaded from the host computer 201. A printer engine 209 prints created data.

The host computer 201 executes a program loaded from an external storage device that uses removable media such as a hard disk (HD) 201b, a CD-ROM drive 201c, or the like onto a RAM 201d. With this program, the host computer controls itself and the entire printing system, and executes the sequences shown in the flow charts to be described later. An I/O interface 201e communicates with the printer 1000.

In this embodiment, a laser beam printer will be exemplified as the printer 1000. The arrangement of the laser beam printer to which this embodiment can be applied will be explained below with reference to FIG. 2.

Figure 2:
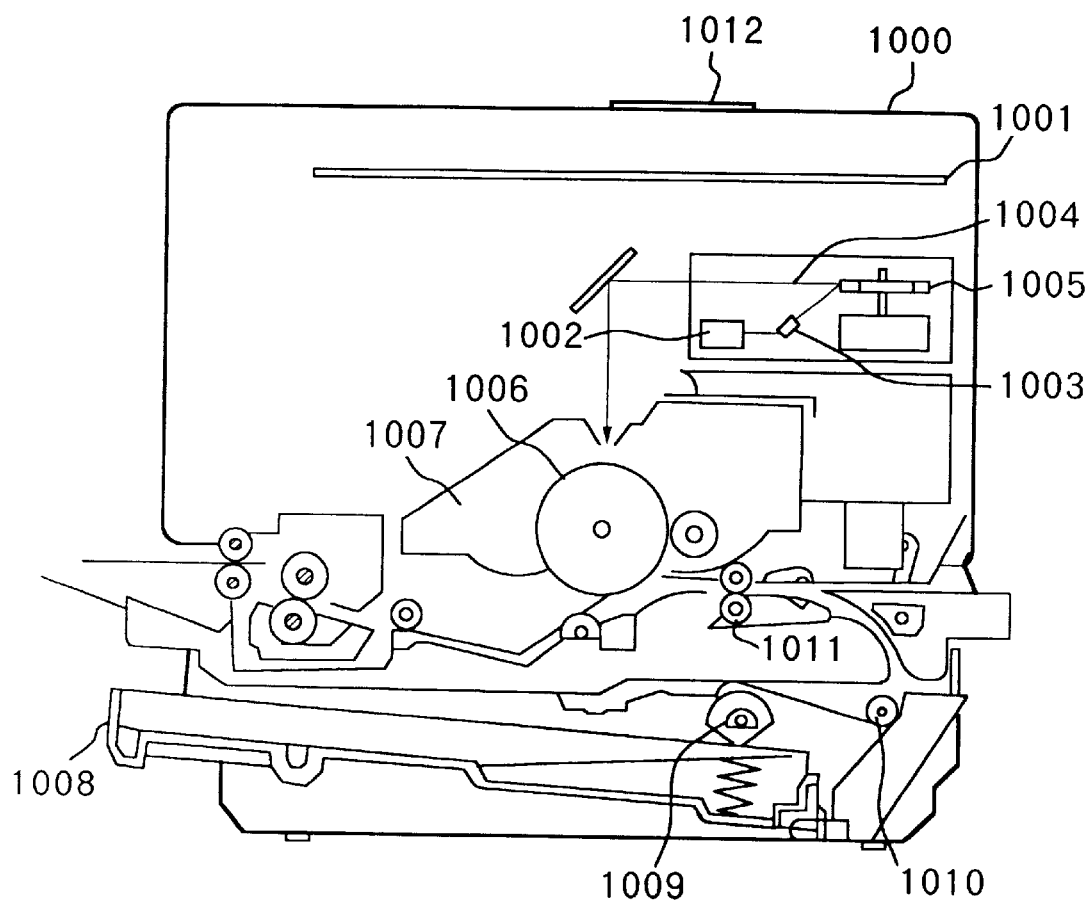
FIG. 2 is a sectional view of a laser beam printer 1000.

FIG. 2 is a sectional view showing the arrangement of a laser beam printer (to be referred to as an LBP hereinafter) to which this embodiment is applied. This LBP can register character patterns, standard formats (form data), and the like from a data source (not shown). Note that the printing apparatus to which this embodiment is applied is not limited to the LBP, but may be printing apparatuses of other printing schemes such as an ink-jet scheme and the like.

Referring to FIG. 2, the LBP main body 1000 receives and stores character information (character codes), form information, macro commands, or the like supplied from an external apparatus such as the host computer 201 connected thereto. Also, the LBP main body 1000 generates corresponding character patterns and the like in accordance with such information, and forms an image on a recording paper sheet as a recording medium. The control panel 1012 has switches for operations, LED indicators, and the like. A printer control unit 1001 controls the overall LBP main body 1000, and interprets character information and the like supplied from the host. The printer control unit 1001 mainly converts character information into a video signal of a corresponding character pattern, and outputs it to a laser driver 1002. The laser driver 1002 is a circuit for driving a semiconductor laser 1003, and ON/OFF-controls a laser beam 1004 emitted by the semiconductor laser 1003 in accordance with an input video signal. The laser beam 1004 is deflected by a rotary polygonal mirror 1005 in the right-and-left direction to scan and expose the surface of an electrostatic drum 1006. With this exposure, an electrostatic latent image of the character pattern is formed on the electrostatic drum 1006. This latent image is developed by a developing unit 1007 placed around the electrostatic drum 1006, and is then transferred onto a recording paper sheet. As the recording paper sheet, a cut sheet is used, and cut recording paper sheets are stored in a paper cassette 1008 loaded into the LBP 1000. Each cut recording paper sheet is fetched into the apparatus by a pickup roller 1009 and convey rollers 1010 and 1011, and is supplied to the electrostatic drum 1006.

Figure 3:
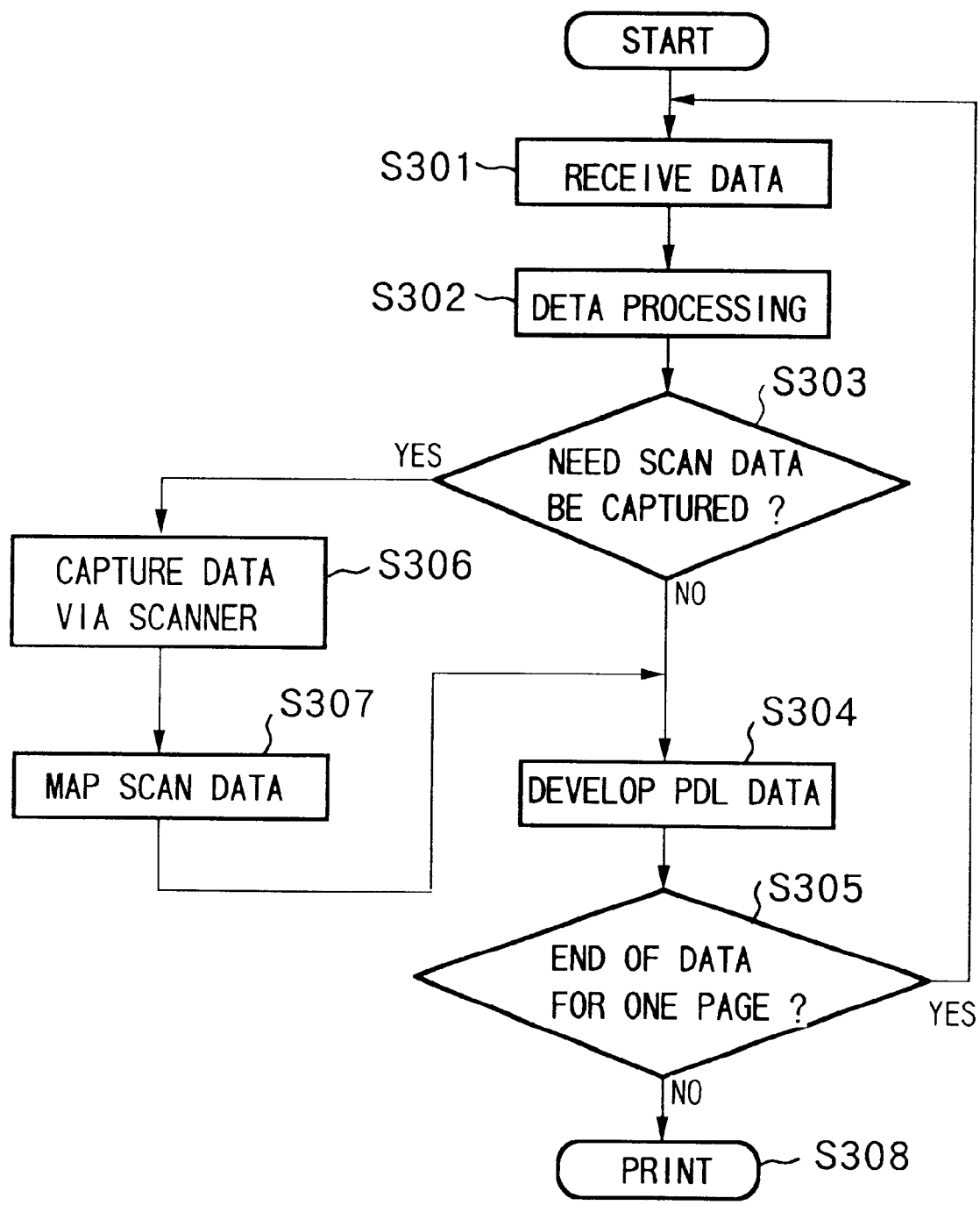
FIG. 3 is a flow chart showing the operation sequence of a printer according to the first embodiment.

FIG. 3 is a flow chart showing the operation sequence in this embodiment and, especially, the operation sequence for synthesizing scan data and PDL data and printing the synthesized data. The operation of the printing system will be described below with reference to FIGS. 2 and 3.

When the user completes, e.g., editing of a document and instructs printing of the created document or the like at the host computer, the host computer 201 converts the created document data into PDL data that can be interpreted by the printer 1000. After that, it is checked if the document includes a page with a scan data insertion instruction. If such page is found, a capture request command for predetermined scan data is inserted in the generated PDL data in advance in correspondence with the designated page. Finally, the generated PDL data is transmitted to the printer 1000. Upon reception of this data, the printer operates in the sequence shown in FIG. 3.

When the host computer 201 transmits print data to the printer 1000, the I/O 204 receives the data (step S301), and the PDL interpreter 205 performs processing such as interpretation of the received print data and the like (step S302). The PDL interpreter 205 checks if the print data includes a capture instruction of scan data via the scanner 202 (step S303). If a command for synthesizing scan data with immediately preceding developed page data is detected from the PDL data, the PDL interpiter 205 instructs the scanner controller 208 to capture data at the designated resolution (designated in the PDL data) or at a resolution closest to the designated resolution. In response to this instruction, the scanner controller 208 captures data via the scanner 202 and the I/O 207 (step S306), and stores the captured data on the memory 206 (step S307).

After step S307 or if it is determined in step S303 that the print data does not include any instruction for capturing data via the scanner 202, image data based on the PDL data is developed on the memory 206 (step S304). In this case, an image generated based on the PDL data is superposed so that the image already mapped on the memory 206 serves as a background image.

Upon completion of the above-mentioned processing, it is checked if data for one page has been prepared (step S305). If NO in step S305, the processing restarts from step S301; otherwise, the data for one page is printed (step S308).

Upon storing scanner data in step S307, the captured scanner data is directly stored without being subjected to any processing such as trimming, masking, or variable-magnification processing.

As described above, the printing apparatus of this embodiment automatically reads scan data in accordance with PDL data sent from the host computer, and can synthesize the PDL data and scan data therein. Hence, the scanner need not transfer any scan data to the host computer and vice versa. For this reason, the communication traffic between the scanner 202 and printer 1000 can be reduced. In this way, especially when the host computer is connected to the printer via a communication network such as a local area network or the like shared by other host computers and peripheral apparatuses, contention upon using the network or printer can be avoided.

Also, since the host computer need not synthesize images, its resources can be effectively used.

Since a command for synthesizing scan data is supplied to the printer as a part of PDL commands, synthesis of scan data can be instructed with respect to a desired page.

[Second Embodiment]

In the first embodiment, data captured by the scanner is simply synthesized with data developed based on PDL data. In this embodiment, the location in which scan data is to be inserted is designated by PDL data.

Figure 4:
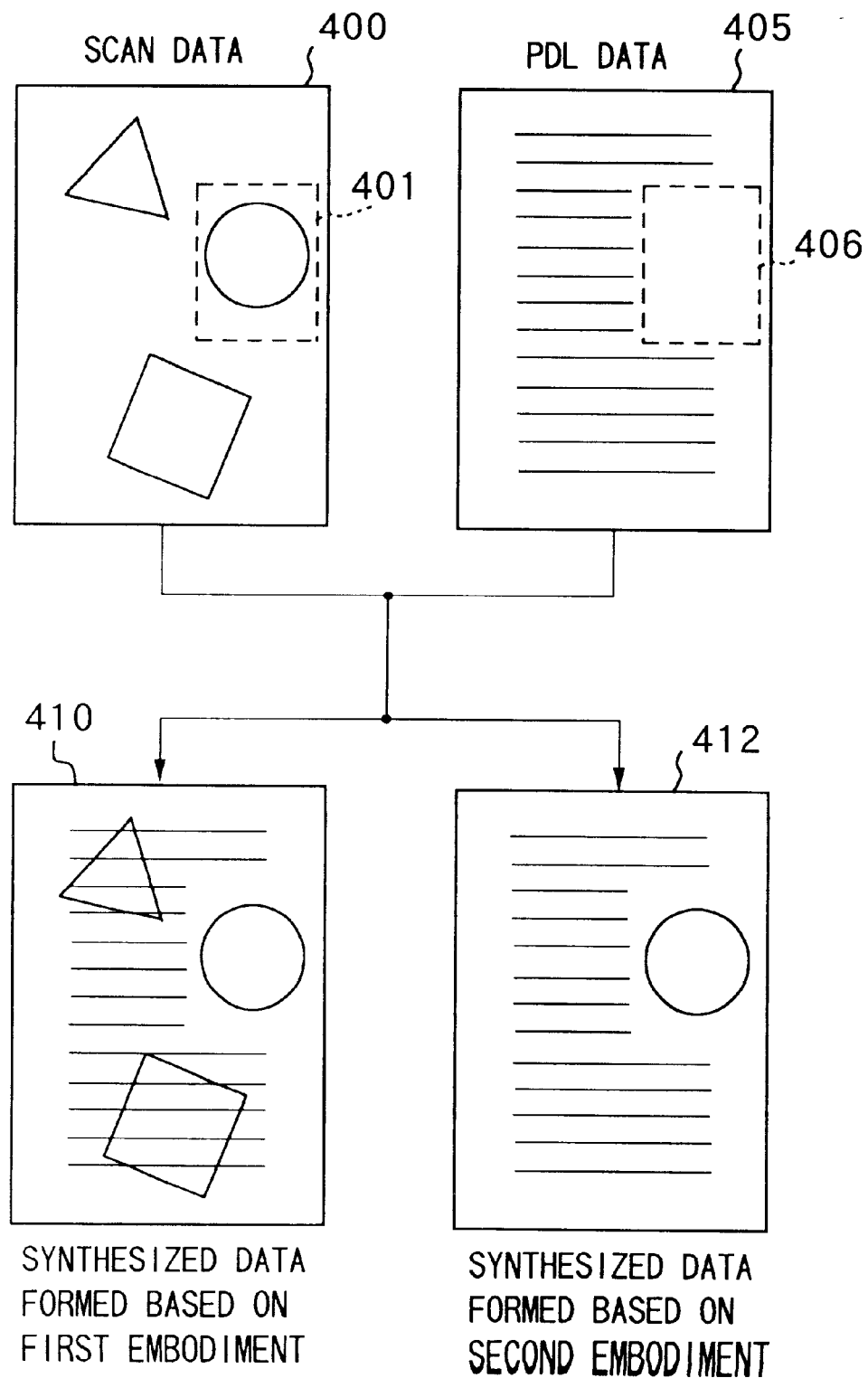
FIG. 4 shows examples of images synthesized in the first and second embodiments.

FIG. 4 is a view for explaining the difference between the first and second embodiments. Upon printing synthesized data of scan data 400 and PDL data 405, if these data are synthesized according to the first embodiment, image data is generated by superposing the PDL data on the scan data 400 as a background, as indicated by synthesized data 410. Hence, in the first embodiment, scan data must not contain any data which is not required for synthesis with PDL data (in FIG. 4, a portion other than a region 401 in the scan data 400).

On the other hand, in this embodiment, an insertion region 406 where the scan data 400 is inserted in image data developed based on PDL data is designated by PDL data. In the printer, a selection region 401 as a region of scan data corresponding to the insertion region 406 is stored in the memory 206, and the PDL data 405 is overwritten thereon to generate synthesized data 412.

Figure 5:
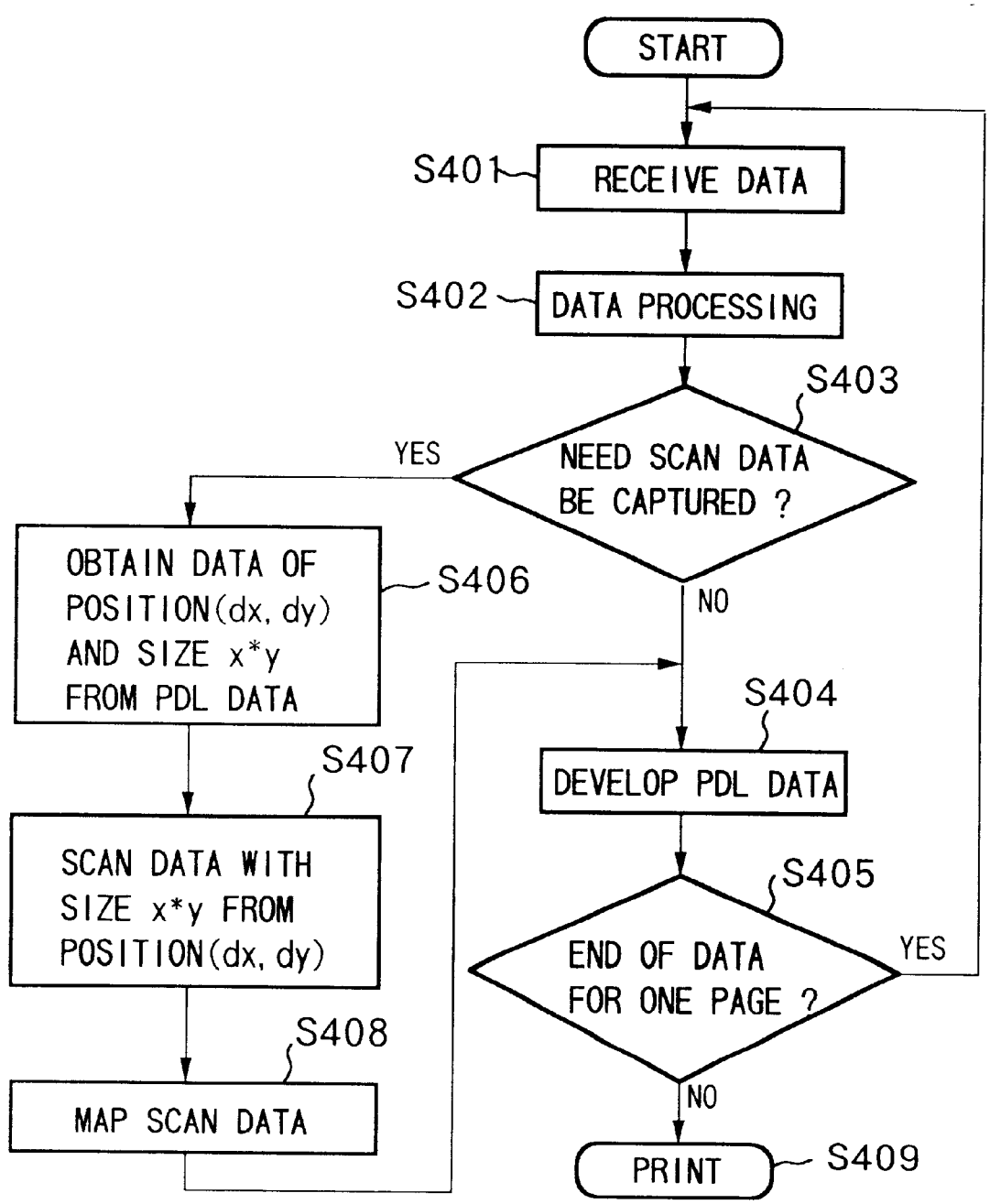
FIG. 5 is a flow chart showing the operation sequence of a printer according to the second embodiment.

FIG. 5 shows the processing sequence of the printer for forming an image, as described above.

When the host computer 201 transmits print data to the printer 1000, the I/O unit 204 receives that data (step S401), and the PDL interpreter 205 performs processing such as interpretation of the received print data and the like (step S402). The PDL interpreter 205 checks if the print data includes a capture instruction of scan data via the scanner 202 (step S403). If a command for synthesizing scan datawith immediately preceding mapped page data is detected from the PDL data, the PDL interpreter instructs the scanner controller 208 to capture data at the designated resolution (designated in the PDL data) or at a resolution closest to the designated resolution. Also, a position (dx, dy) and size x*y for specifying a region of scan data to be synthesized, which are included in the PDL data in association with the synthesis command, are set in the scanner controller 208 (step S406). The scanner controller 208 captures data of the designated region via the scanner 202 and the I/O unit 207 (step S407), and stores it in the memory 206 (step S408). Note that the designated region may be cut from the scanned data and may be stored in location in the memory corresponding to the designated region, or the designated region alone may be scanned if the scan can do so mechanically.

Figure 6:
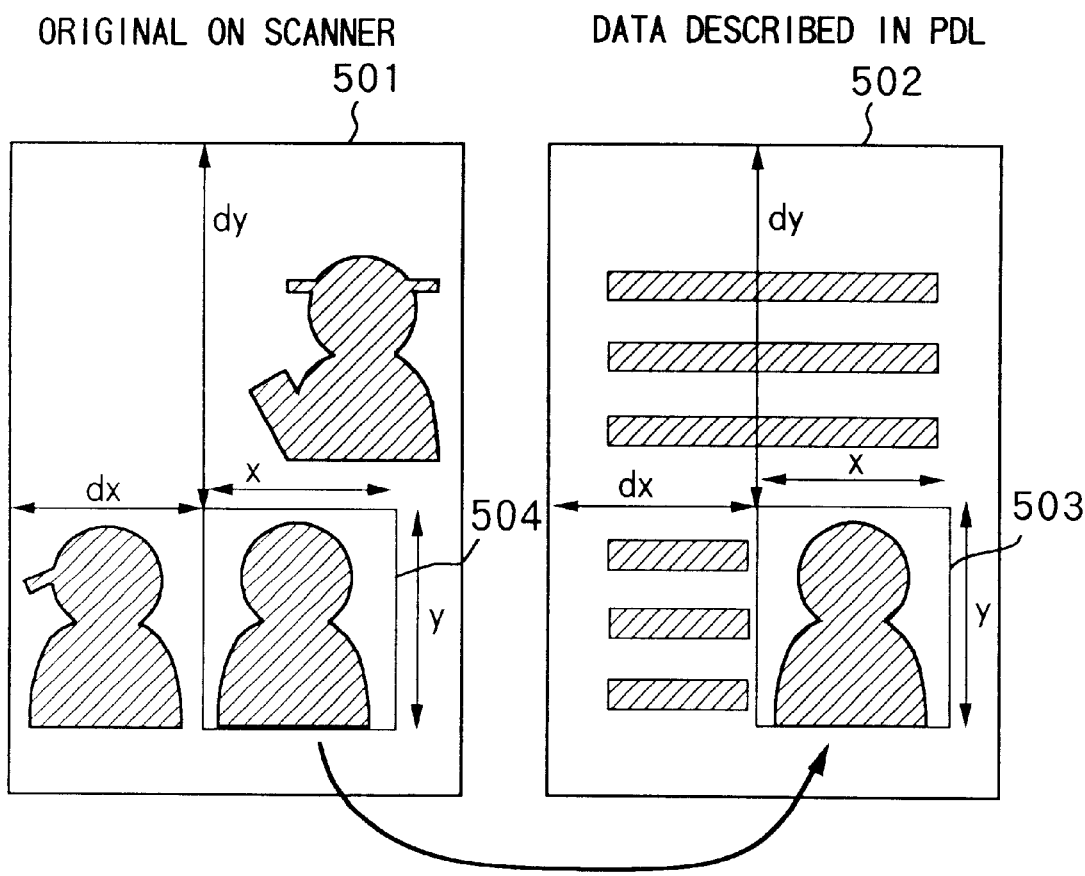
FIG. 6 shows the image synthesis process by the printer of the second embodiment.

FIG. 6 shows an example of an image obtained by synthesizing scan data 501 and PDL data 502. Referring to FIG. 6, an insertion region 503 is designated by the coordinates (dx, dy) of the upper left corner indicating its position, and a width x and length y indicating its size. From the scan data 501, a selection region 504 corresponding to the insertion region 503 is cut, and the scan data is synthesized with the PDL data 502.

After step S408 or if it is determined in step S403 that the print data does not include any instruction for capturing data via the scanner 202, image data based on the PDL data is developed on the memory 206 (step S404). In this case, an image generated based on the PDL data is superposed so that the image already developed on the memory 206 serves as a background image.

Upon completion of the above-mentioned processing, it is checked if data for one page has been prepared (step S405). If NO in step S405, the processing restarts from step S401; otherwise, the data for one page is printed (step S409).

As described above, according to this embodiment, the same effect as in the first embodiment can be obtained. In addition, since the insertion region is accurately designated by PDL data, even when scan data contains an image which is not required in data synthesis, the required scan data alone can be synthesized with the PDL data.

[Third Embodiment]

In the first and second embodiments, scan data is transmitted to the LBP 1000. In this embodiment, the LBP 1000 transmits the received scan data to the host computer, so that scan data can be previewed on the host computer. Furthermore, which scan data is assigned to which insertion region of scan data designated in advance in PDL data can be designated on the basis of the scan data previewed on the host computer 201.

Figure 7:
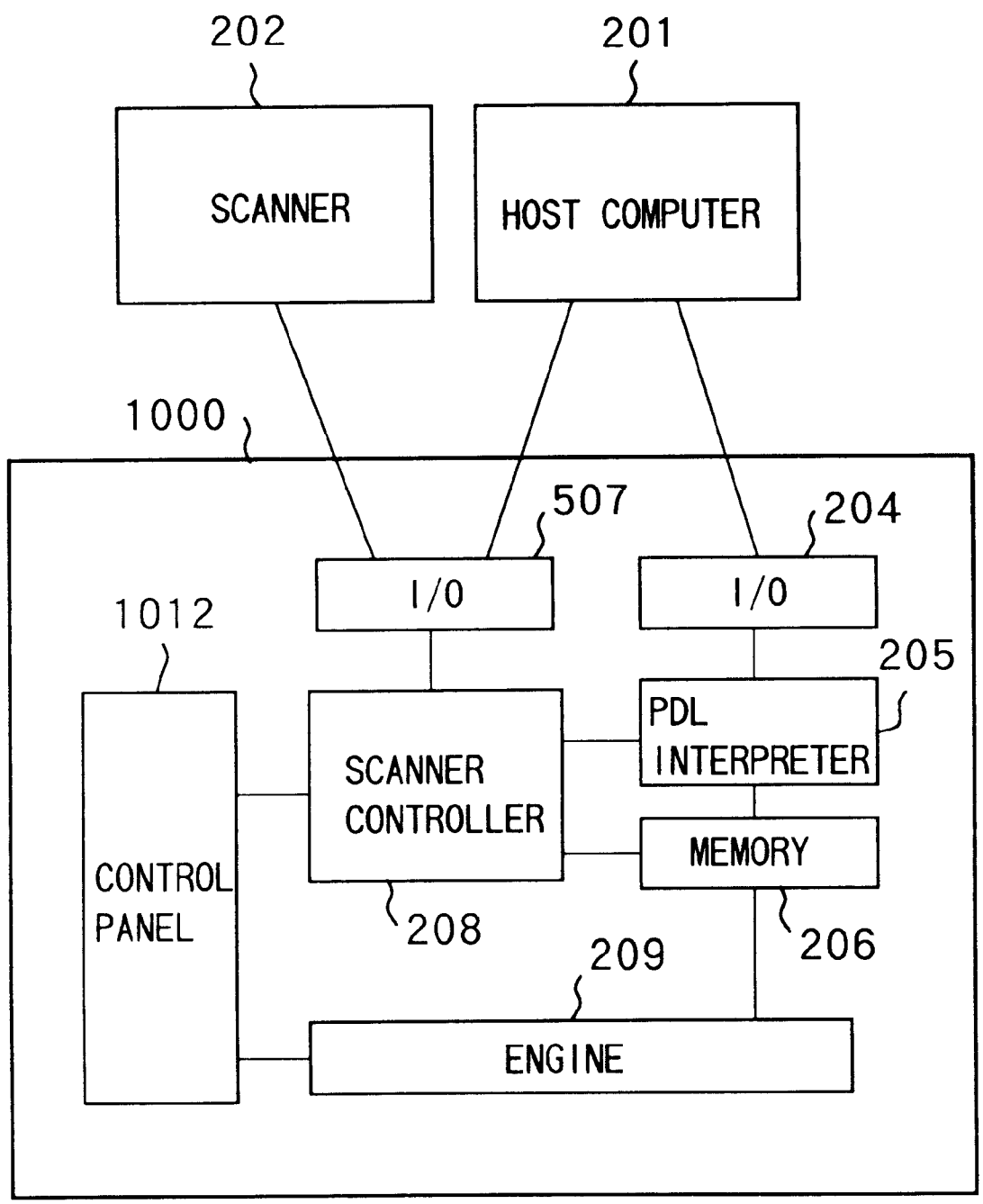
FIG. 7 is a block diagram showing an example of the arrangement of a printing system in the third to sixth embodiments.

FIG. 7 is a block diagram showing an example of the arrangement of a printing system to which this embodiment is applied. Note that the same reference numerals in FIG. 7 denote blocks having the same functions as those in FIG. 1 in the first and second embodiments. Upon reception of data from the scanner 202, an I/O 507 sends the data to both the scanner controller 208 and host computer 201. The host computer 201 thins out dots from the received scan data, and displays the scan data on its screen by a preview function. Alteratively, the I/O 507 may thin out dots from the scan data in correspondence with the display function of the host computer, and may transmit the thinned data to the host computer.

Figure 8:
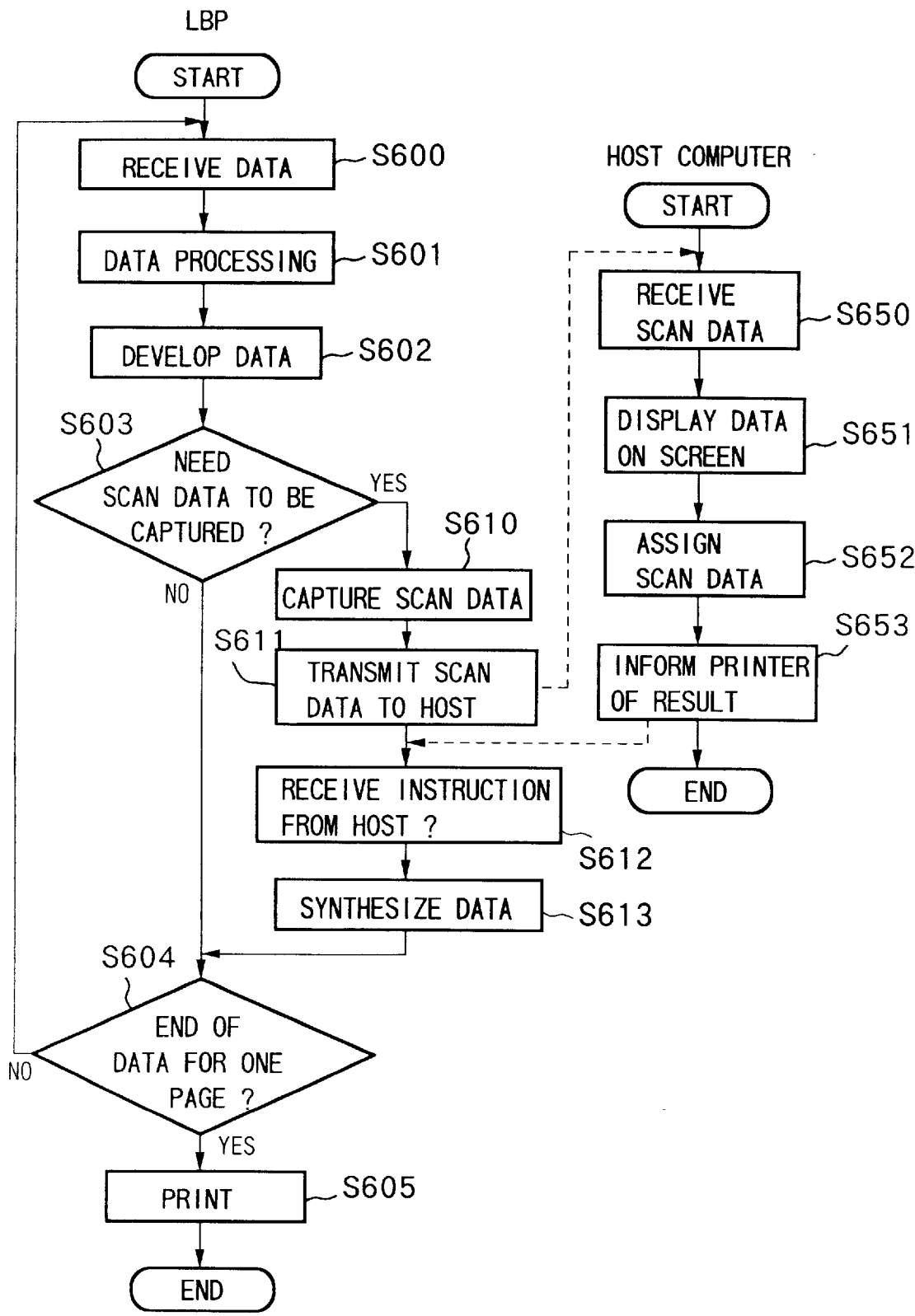
FIG. 8 is a flow chart showing the operation sequences of an LBP 1000 and host computer 201 in the third embodiment.

FIG. 8 is a flow chart showing the operation sequences in the LBP 1000 and host computer 201 in this embodiment. The sequence in the LBP 1000 is shown in steps S600 to S613, and the sequence in the host computer 201 is shown in steps S650 to S653.

The operation sequence in the LBP 1000 will be described first. When the LBP 1000 receives PDL data transmitted from the host computer 201 at the I/O 204 (step S600), the PDL interpreter 205 processes the PDL data (step S601), and develops image data based on the PDL data on the memory 206 (step S602).

If the PDL interpreter 205 detects a command for directing synthesis of the developed data and scan data (YES in step S603), it instructs the scanner controller 208 to capture data from the scanner 202. Upon reception of the capture instruction, the scanner controller 208 captures scan data via the I/O 507 (step S610). The resolution upon capturing the scan data is set at a value already designated by the PDL interpreter 205. If scan data cannot be captured at the designated resolution, a resolution closest to the designated resolution is used. At the same time, the captured scan data is also transmitted from the I/O 507 to the host computer 201 (step S611). At this time, if the scan data is transmitted after its resolution is dropped in correspondence with the display resolution of the preview function, the volume of data to be transmitted can be reduced. The dotted arrow which extends from step S611 toward step S650 in FIG. 8 indicates the transmission process of the scan data captured in step S610.

After that, the scanner controller 208 receives information indicating the position of a selection region in the scan data to be inserted in the insertion region assigned by the PDL data from the host computer 201 (step S612). The contents of the designated selection region in the scan data are written in the insertion region of the image data developed on the memory 206 based on the PDL data in step S602 to synthesize the PDL data and scan data (step S613).

On the other hand, if it is determined in step S603 that no instruction for capturing data from the scanner 202 is detected, the flow advances to step S604.

It is checked in step S604 if data for one page has been prepared. If NO in step S604, the processing restarts from step S600; otherwise, the flow advances to step S605 to print the image data stored in the memory 206.

The operation sequence in the host computer 201 will be explained below. The host computer 201 receives the thinned scan data transmitted in step S611 of the LBP 1000 (step S650), and displays the received data on the screen (step S651). On the display screen, the operator designates the selection region of scan data. According to this designation, the selection region of the scan data is assigned to each insertion region of PDL data (step S652). The assignment result is supplied to the LBP 1000 (step S653). The dotted arrow which extends from step S653 toward step S612 in FIG. 8 indicates the transmission process of the assignment result in step S652 to the LBP 1000.

Since the insertion region of the scan data is designated in advance in the PDL data, the identifier and size of each insertion region may be transmitted to the host computer together with the scan data in step S611.

Figure 9:
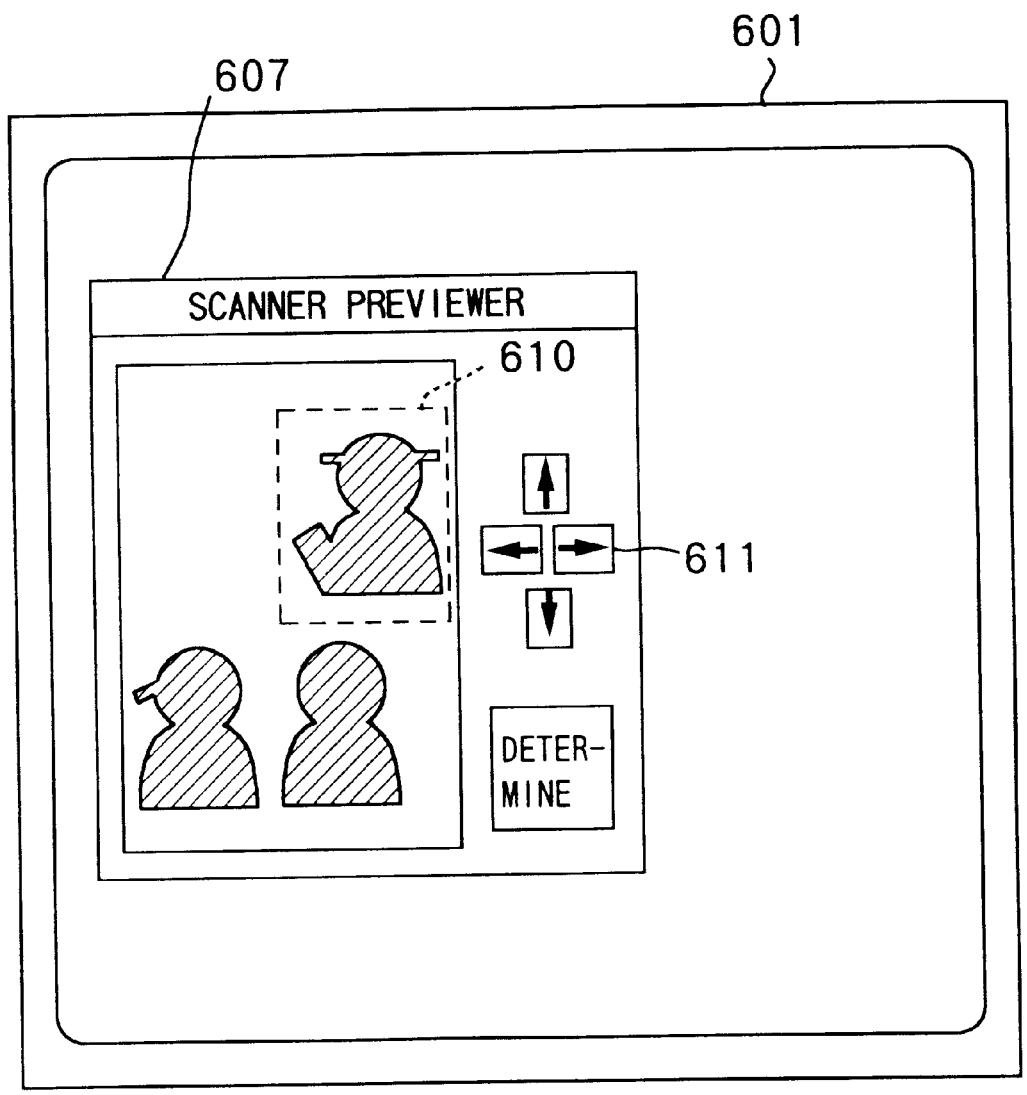
FIG. 9 shows a preview window of scanner data, displayed on the host computer in the third embodiment.

FIG. 9 shows an example of the preview window on the host computer. The host computer displays a frame 610 corresponding to the size of the insertion region received from the printer on a preview window 607. The operator moves the frame 610 by selectively operating move buttons 611, thereby designating the selection region to be synthesized with the PDL data.

In the PDL data, a plurality of insertion regions may be designated. In such case, the identifier of each insertion region and the selection region of the scan data are assigned in correspondence with each other, and the assignment result is transmitted to the printer 1000 in step S652.

As described above, according to this embodiment, a user's desired region of the scan data can be synthesized with PDL data and the synthesized data can be printed. The region of the scan data is designated by moving the frame with a size corresponding to the region designated by the PDL data on the preview window. For this reason, a desired region can be designated very easily.

The scan data may be transmitted to the host computer 201 without dropping its resolution in step S611, and the host computer 201 may receive the scan data by dropping its resolution in step S650.

[Fourth Embodiment]

In the second embodiment, the position of the insertion region designated by the PDL data corresponds to that of the selection region of scanner data to be synthesized there. In the third embodiment, the size of the insertion region designated by the PDL data corresponds to that of the selection region of the scanner data to be synthesized. In this embodiment, in addition to the preview function of data captured by the scanner 202 on the host computer 201, the operator designates both the position and size of the insertion region in PDL data. Upon completion of designation of the position and size, the host computer 201 generates PDL data, and transmits it to the printer 1000. The system of this embodiment has the same arrangement as that shown in FIG. 7.

This embodiment will be described below with reference to FIG. 7 and FIGS. 10 to 15.

The processing on the host computer 201 will be explained first with reference to the flow chart in FIG. 10. The user creates a document or the like using a predetermined application program. The user appends an insertion command of scan data, and the size and position of an insertion region to a desired page of this document. This operation depends on the application used for creating the document.

If a print request has been issued, a printer driver is started. The sequence shown in FIG. 10 indicates the subsequent operation of the printer driver. The printer driver checks if the created document data includes a scan data synthesis command (step S1001). If NO in step S1001, a window (to be referred to as a printer driver window hereinafter) 602 shown in FIG. 11 is displayed on a monitor 601 of the host computer 201 while inactivating scan-related buttons such as a scan data insertion position button 603 and scan data preview button 604 (step S1002).

On the other hand, if the scan data synthesis command is detected, the printer driver window 602 is displayed while activating the scan-related buttons (step S1003).

After that, the control waits until the operator operates one of buttons within the displayed window (step S1004). If one of the buttons has been pressed, the flow advances to step S1005 to specify the button pressed.

If the scan data preview button 604 has been pressed, the flow advances to step S1006. The printer driver requests the scanner 202 to scan an original image, and receives image data which is scanned and transmitted by the scanner in response to that request (step S1006). The printer driver displays the received image data on a preview window 607 shown in FIG. 12 (step S1007). The operator operates by selectively using frame move buttons 611 and the like while observing that window. According to this operation, a selection frame 610 indicating a selection region is moved, and the moved position is recorded and displayed (step S1008).

If the scan data insertion position button 603 has been pressed, an insertion position window 606 is displayed (step S1009). On this window, a frame 609 is displayed on the basis of the synthesis position of scan data, which is set in the created document data.

If a print preview button has been pressed, a print preview window (not shown) is displayed (step S1011). However, no data is displayed within the insertion region. It is then checked if scan data is previewed in correspondence with the displayed page (step S1012). If YES in step S1012, data inside the selection frame set in step S1008 is cut from the image data received from the scanner in step S1006, and is synthesized and displayed in the insertion region (step S1013).

If a print button 605 has been pressed, the created document data, the position and size of the set insertion region, and the position and size of the corresponding selection region at that time are converted into PDL data, and the PDL data is transmitted to the printer 1000 (step S1014).

Figure 10:
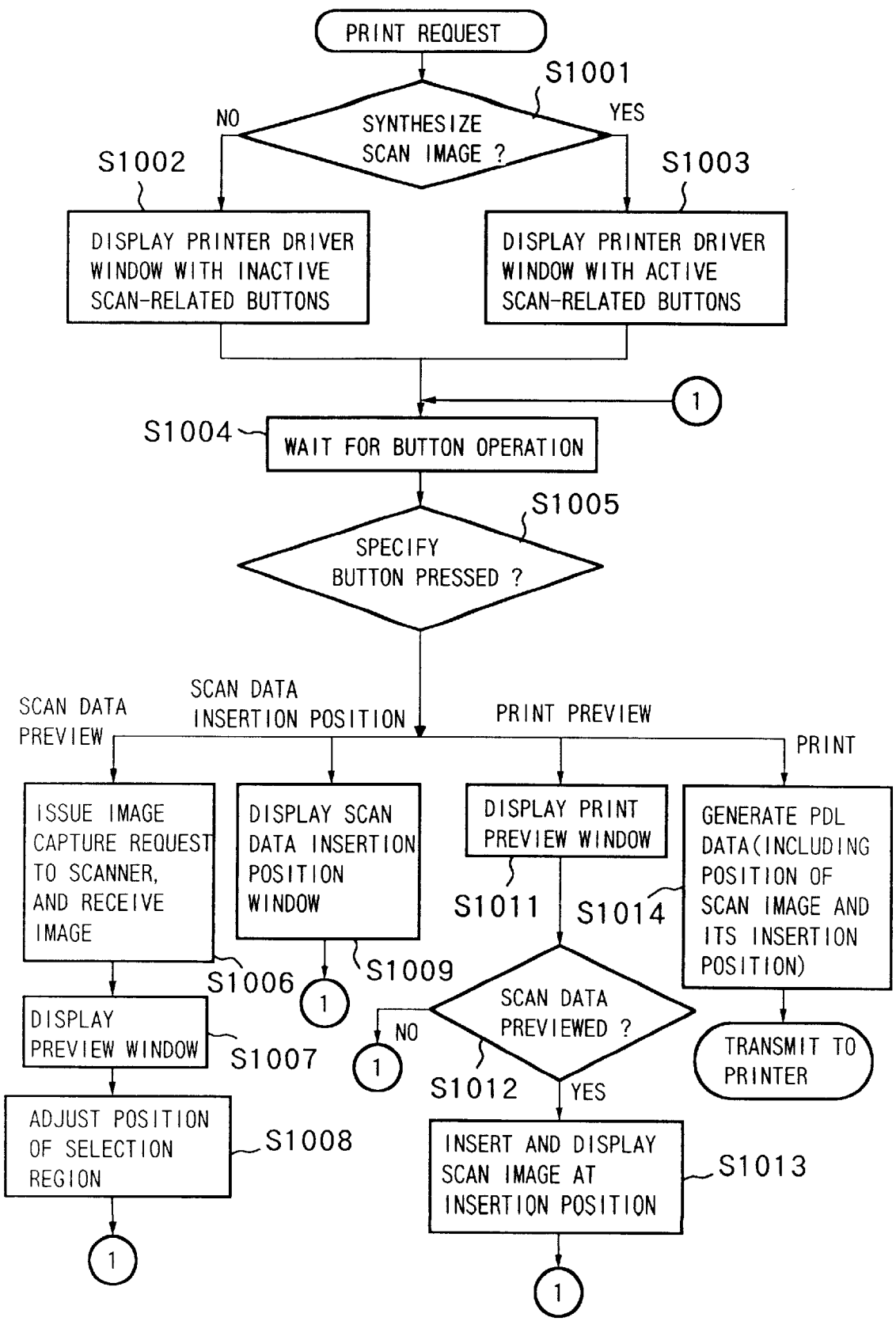
FIG. 10 is a flow chart showing the operation sequence of a host computer according to the fourth embodiment.
Figure 11:
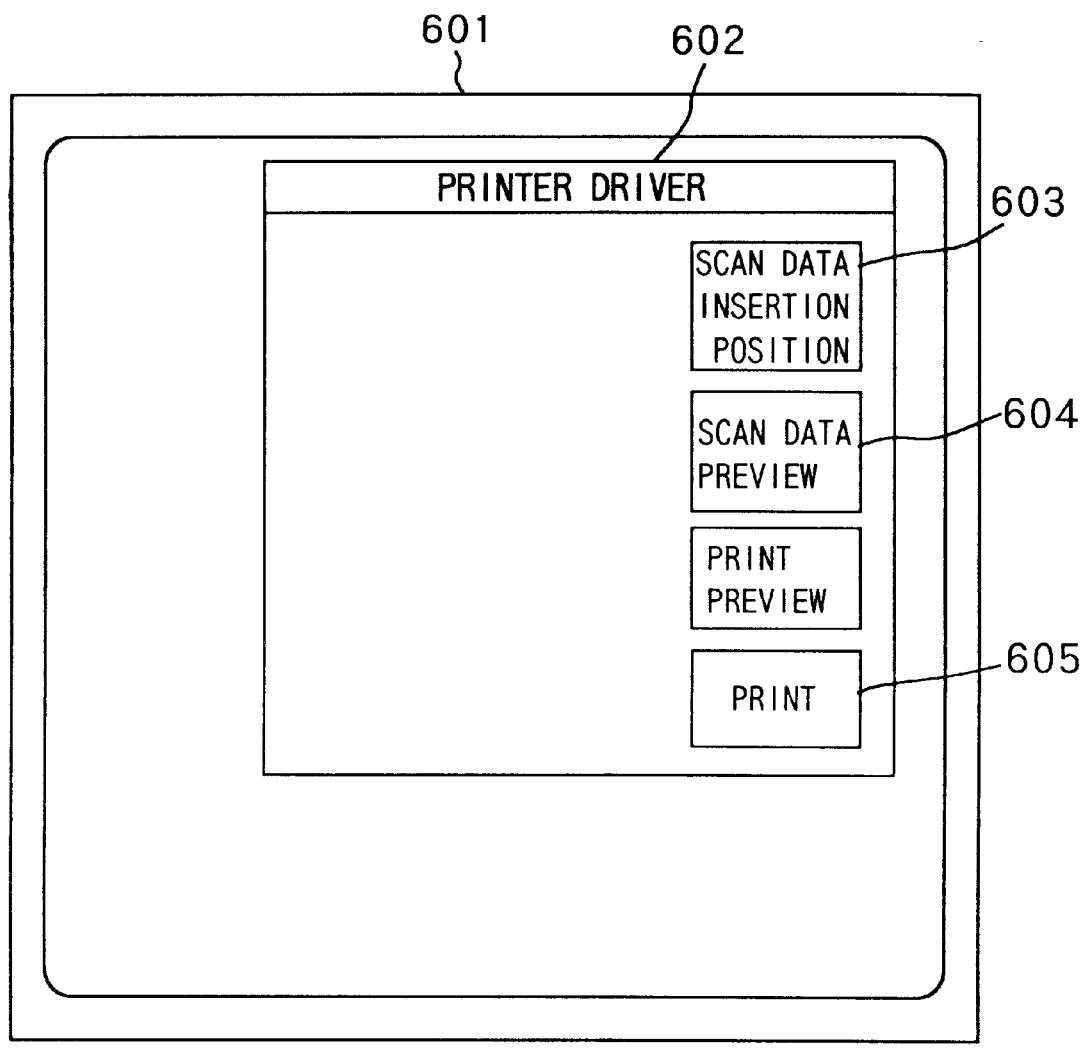
FIG. 11 shows a printer driver window displayed on the host computer in the fourth and fifth embodiments.
Figure 12:
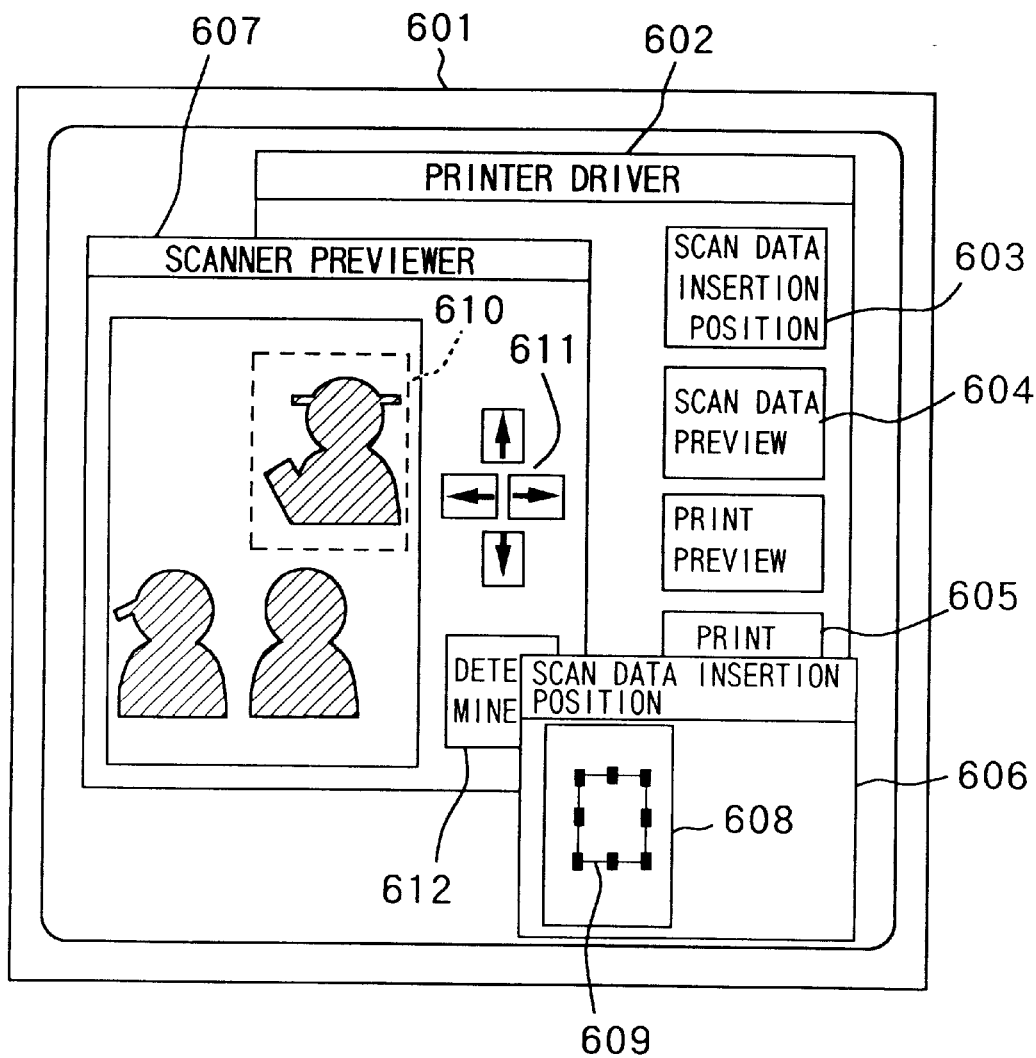
FIG. 12 shows a window displayed on the host computer in the fourth embodiment.
Figure 13:
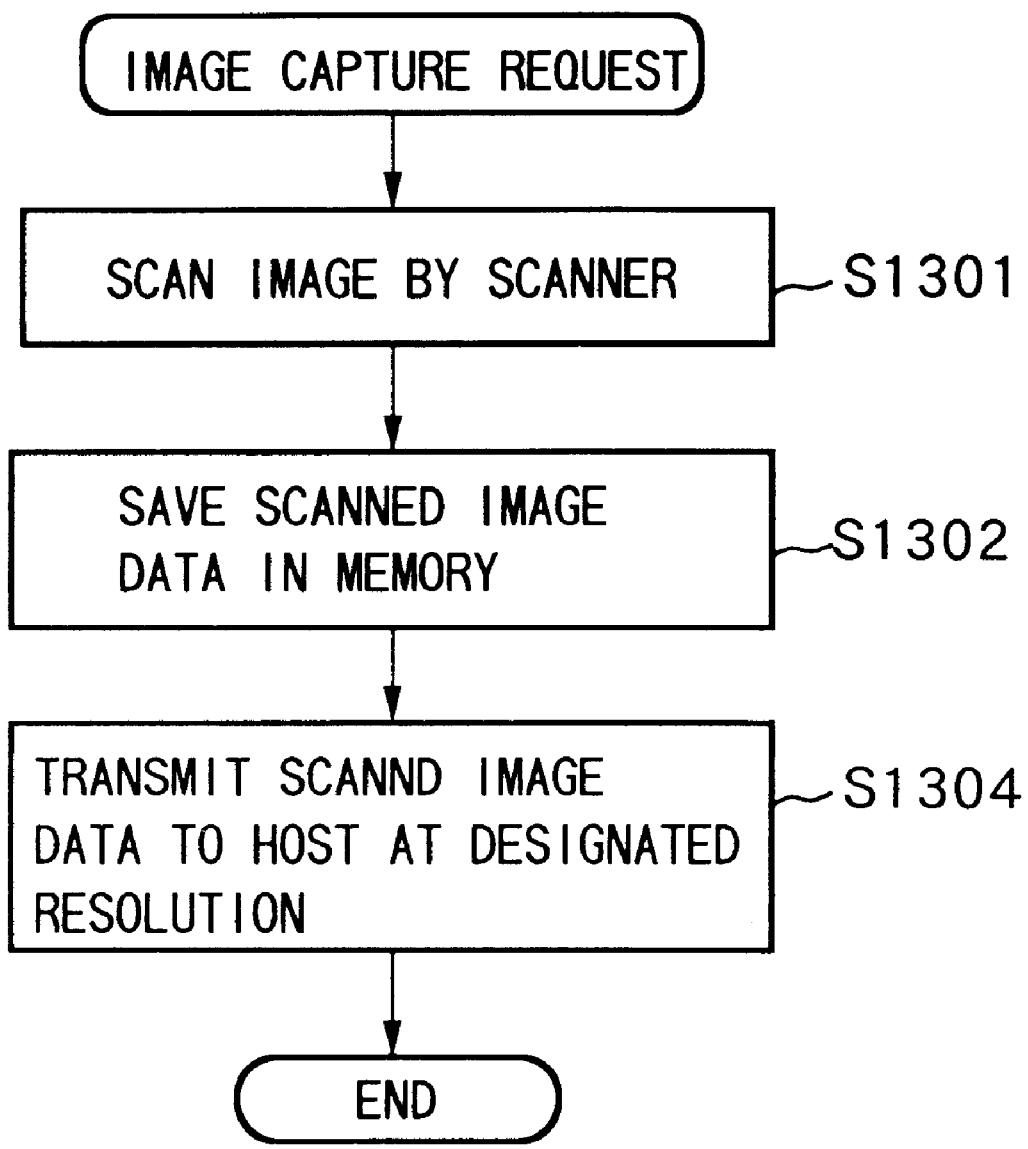
FIG. 13 is a flow chart showing the scanning sequence on the preview window by the printer in the fourth and fifth embodiments.

FIG. 13 is a flow chart showing the operation of the printer 1000 which has been requested to scan image data in step S1006 in FIG. 10. The scanner 202 scans an original image (step S1301). The obtained image data is saved in the memory 206 (step S1302), and is transmitted to the host computer 201 at the designated resolution (step S1304).

Figure 14:
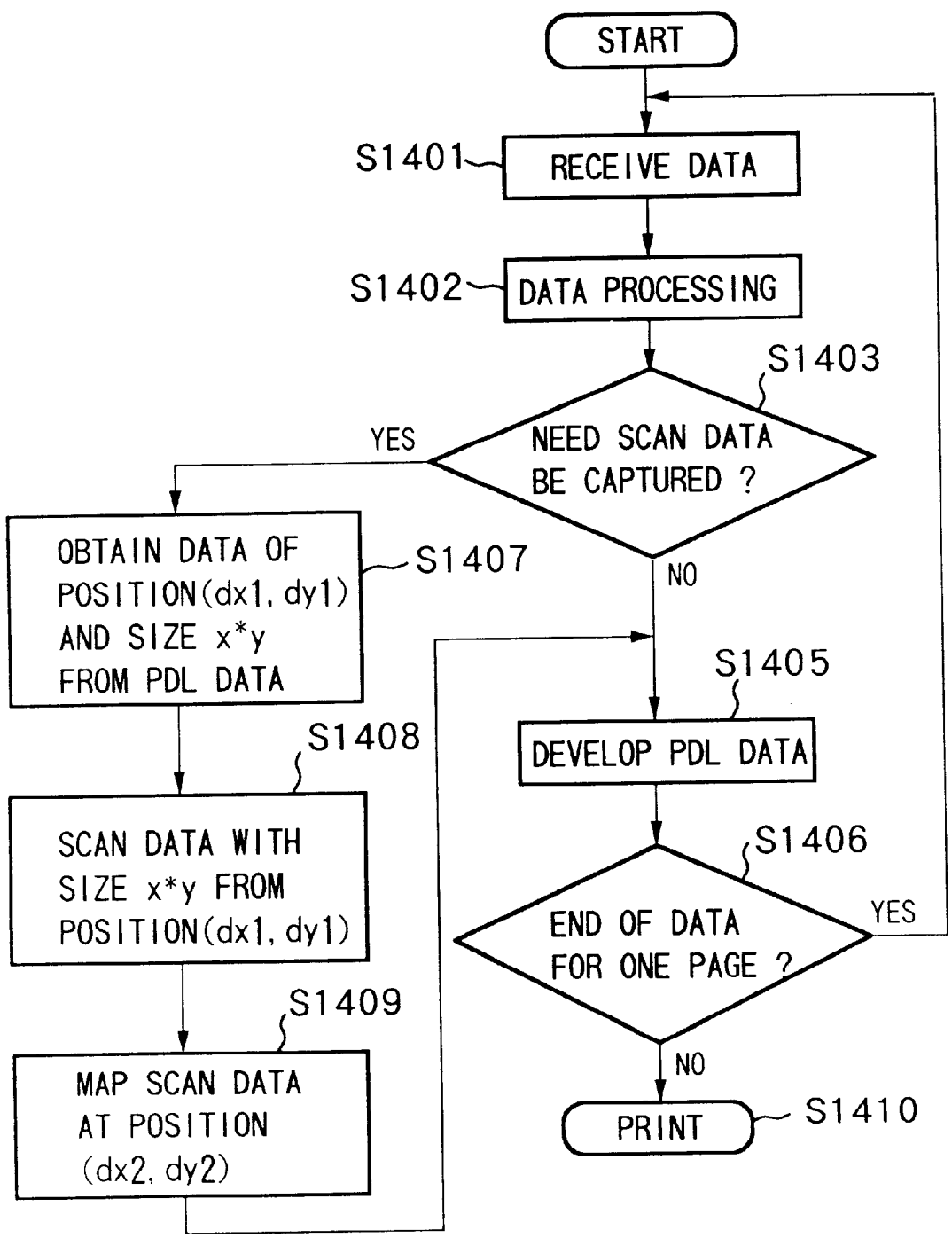
FIG. 14 is a flow chart showing the operation sequence of the printer in the fourth and fifth embodiments.

FIG. 14 shows the operation of the printer 100 which has received PDL data transmitted after step S1014 in FIG. 10.

Upon reception of the PDL data (step S1401), processing such as interpretation of that data or the like is executed (step S1402). It is checked if the PDL data includes a command for directing synthesis of scan data (step S1403). If YES in step S1403, the position (dxl, dyl) and size x*y indicating the selection region of scan data are obtained from the PDL data (step S1407). Then, scan data corresponding to the selection region with the position (dx1, dy1) and size x*y is read (step S1408). At this time, if scan data has already been read for preview, scanning is not done again. In such case, the set selection region is cut from the data saved in step S1302. If preview is not made, scanning is done to read an original image.

The selection region of the scanned data is mapped at the position (dx2, dy2) of the set insertion region (step S1409).

If it is determined in step S1403 that no synthesis instruction of scan data is detected, or after step S1409, dot image data is developed on the memory 206 on the basis of the PDL data (step S1405). At this time, the dot image data is developed to use the data already mapped on the memory 206 as a background. For this reason, if scan data has already been stored in the memory 206 in step S1409, an image is synthesized using that data as a background. When data for one page is obtained in such manner (step S1406—YES), the data is printed in step S1410.

Figure 15:
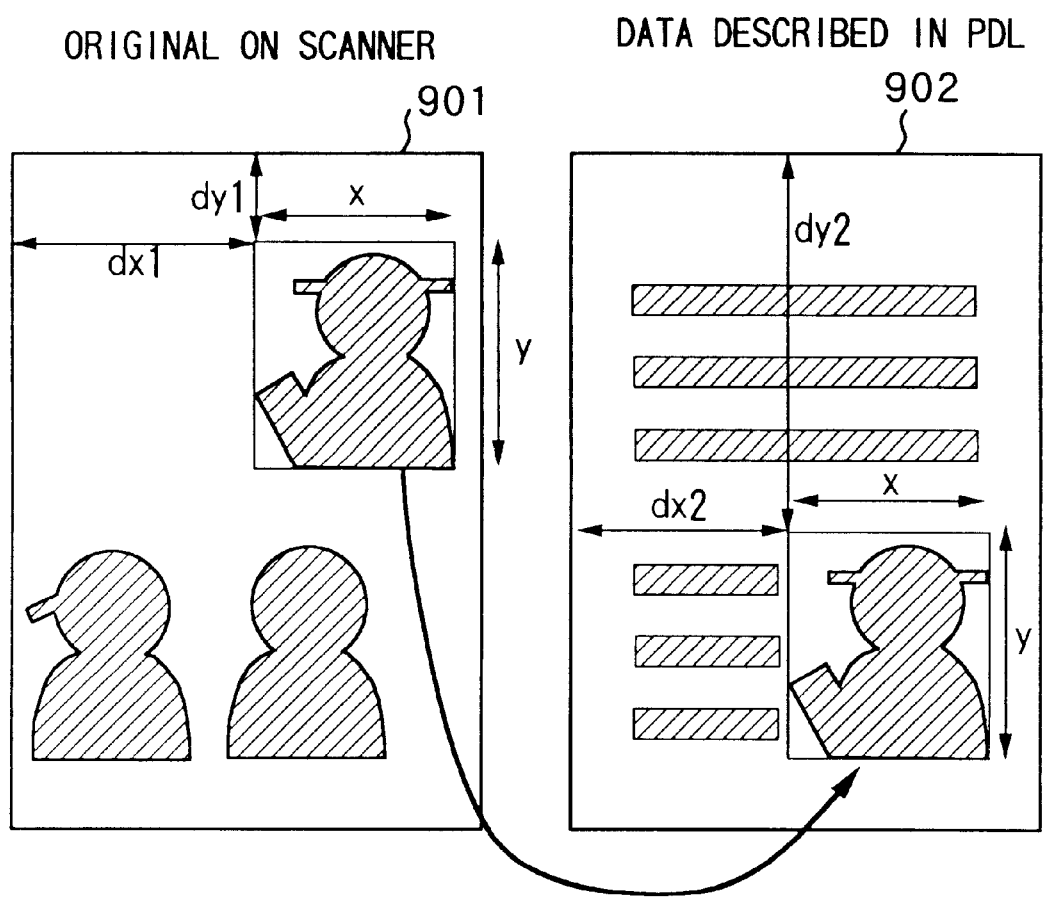
FIG. 15 shows an example of an image synthesized in the fourth and fifth embodiments.

FIG. 15 shows an example of scanner data and PDL data to be synthesized in the aforementioned sequence. In FIG. 15, an image within the selection region set on data 901 scanned by the scanner is synthesized into the insertion region of PDL data 902.

In this fashion, the selection region can be freely set in scan data on the screen of the host computer. Since the user can set the region while observing the previewed scan data, his or her desired partial image can be accurately selected, and the selected portion can be synthesized with an image such as a document or the like expressed by PDL data. For this reason, the selection region in an original image to be scanned need not be accurately aligned to the insertion region of scan data in a print to be finally output. Also, since the printer performs synthesis, the processing load on the host computer can be reduced.

When the scan data is preview-displayed, image data must be transferred from the scanner to the host computer. The image data to be transferred in such case can be the one thinned out in correspondence with the display screen. Also, the host computer need not transmit scan data to the printer. For this reason, image data sent onto the network is small data, and does not increase any communication traffic.

After step S1009 in FIG. 10, operations for moving the insertion frame 609 indicating the insertion region, changing its size, or adding the frame may be allowed. In such case, upon movement or addition of the insertion frame, commands corresponding to such operations are appended to PDL data generated in step S1014. When the size of the insertion frame 609 has been changed, that of the selection frame 610 is changed accordingly.

[Fifth Embodiment]

In the third and fourth embodiments, at the time of generation of PDL data before the printer driver window 602 is displayed, whether or not data is to be scanned is determined. Alternatively, after the printer driver window 602 is displayed, scan data may be synthesized.

Figure 16:
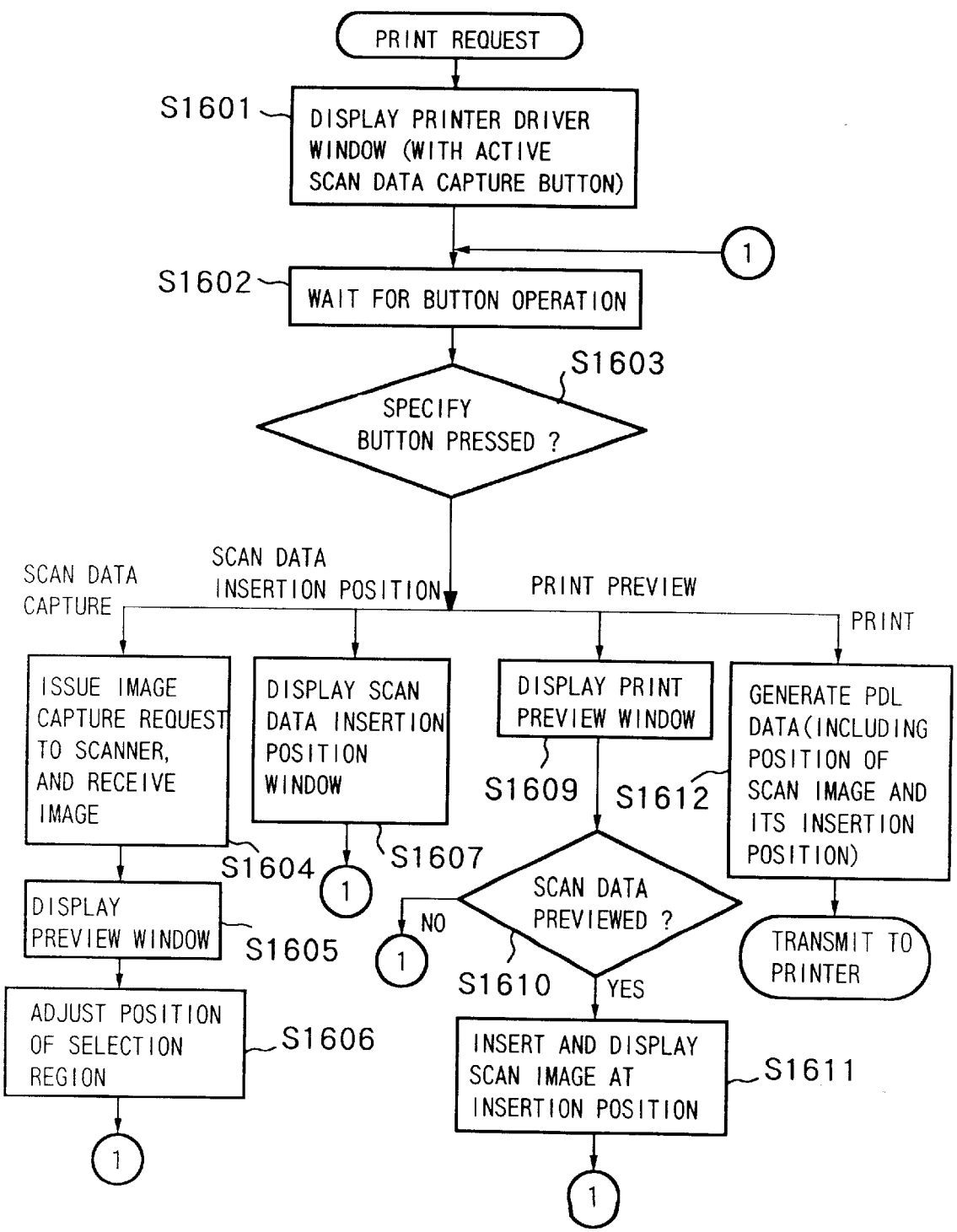
FIG. 16 is a flow chart showing the operation sequence of the host computer according to the fifth embodiment.
Figure 17:
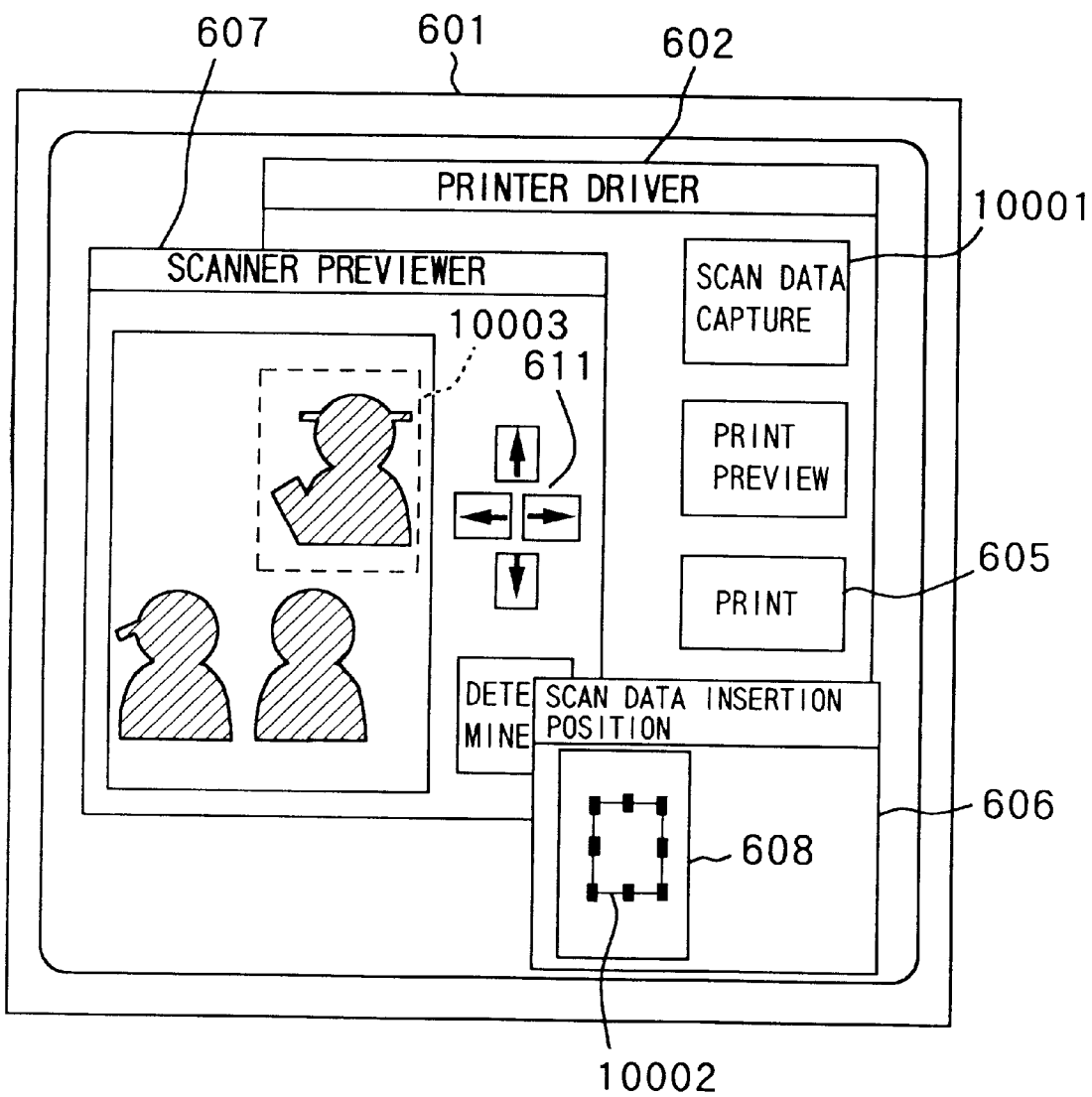
FIG. 17 shows a window displayed on the host computer in the fifth embodiment.

The setting sequence of the selection region in this embodiment will be explained along the flow chart in FIG. 16 with reference to FIG. 17. Note that the system arrangement is the same as that of the first to fourth embodiments.

The processing on the host computer 201 will be explained with reference to the flow chart in FIG. 16. The processing in the printer is the same as that shown in FIGS. 13 and 14 in the fourth embodiment. The user creates a document or the like using a predetermined application program. The user appends an insertion command of scan data, and the size and position of an insertion region, to a desired page of this document. This operation depends on the application used for creating the document.

If a print request has been issued, a printer driver is started. The sequence in FIG. 16 indicates the subsequent operation of the printer driver. The printer driver displays a printer driver window 602 with an active scan data capture button 10001 of those shown in FIG. 17 (step S1601).

After that, the control waits until the operator presses one of the buttons within the displayed window (step S1602). If the operator has pressed one of the buttons, the flow advances to step S1603 to specify the button pressed.

If the scan data capture button 10001 has been pressed, the flow advances to step S1604. The printer driver supplies a scan request of an original image to the scanner 202, and receives image data which is scanned and transmitted by the scanner in response to that request (step S1604). The printer driver displays the received image data as a preview window 607 shown in FIG. 17 (step S1605). The operator operates by selectively using frame move buttons 611 and the like while observing that window. According to this operation, a selection frame 610 indicating a selection region is moved, and the moved position is recorded and displayed (step S1606).

If a scan data insertion position button 603 (hidden in FIG. 17) has been pressed, an insertion position window 606 is displayed (step S1607). On this window, an insertion frame 609 is displayed on the basis of the synthesis position of scan data, which is set in the created document data.

If a print preview button has been pressed, a print preview window (not shown) is displayed (step S1609). However, no data is displayed within the insertion region. It is then checked if scan data is previewed in correspondence with the displayed page (step S1610). If YES in step S1610, data inside the selection frame set in step S1606 is cut from the image data received from the scanner in step S1604, and is synthesized and displayed in the insertion region (step S1611).

If a print button 605 has been pressed, the created document data, the position and size of the set insertion region, and the position and size of the corresponding selection region at that time are converted into PDL data, and the PDL data is transmitted to the printer 1000 (step S1612).

If the scan data capture button is not pressed, PDL data is generated to define as a selection region a region having a position and size corresponding to those of the insertion region of scan data defined in the document data.

With the aforementioned sequence, the same effect as in the fourth embodiment can be obtained. Furthermore, if the operator does not select any selection region, that region on the scan data which corresponds to the insertion region is selected as the selection region. For this reason, the operator may skip determination of the position of the selection region.

[Sixth Embodiment]

In the third and fourth embodiments, a comparison means for comparing the sizes of the insertion region and an assigned region (to be referred to as an assignment region hereinafter) of scan data may be provided, and if the comparison means determines that the two regions have different sizes, a function of displaying a warning message indicating different region sizes, terminating processing as an error, or automatically adjusting the assignment region to the insertion region by enlarging/reducing it in size may be provided. At this time, whether a warning or error message is displayed or automatic enlargement/reduction is made can be switched from the control panel 1012 or host computer.

Figure 18:
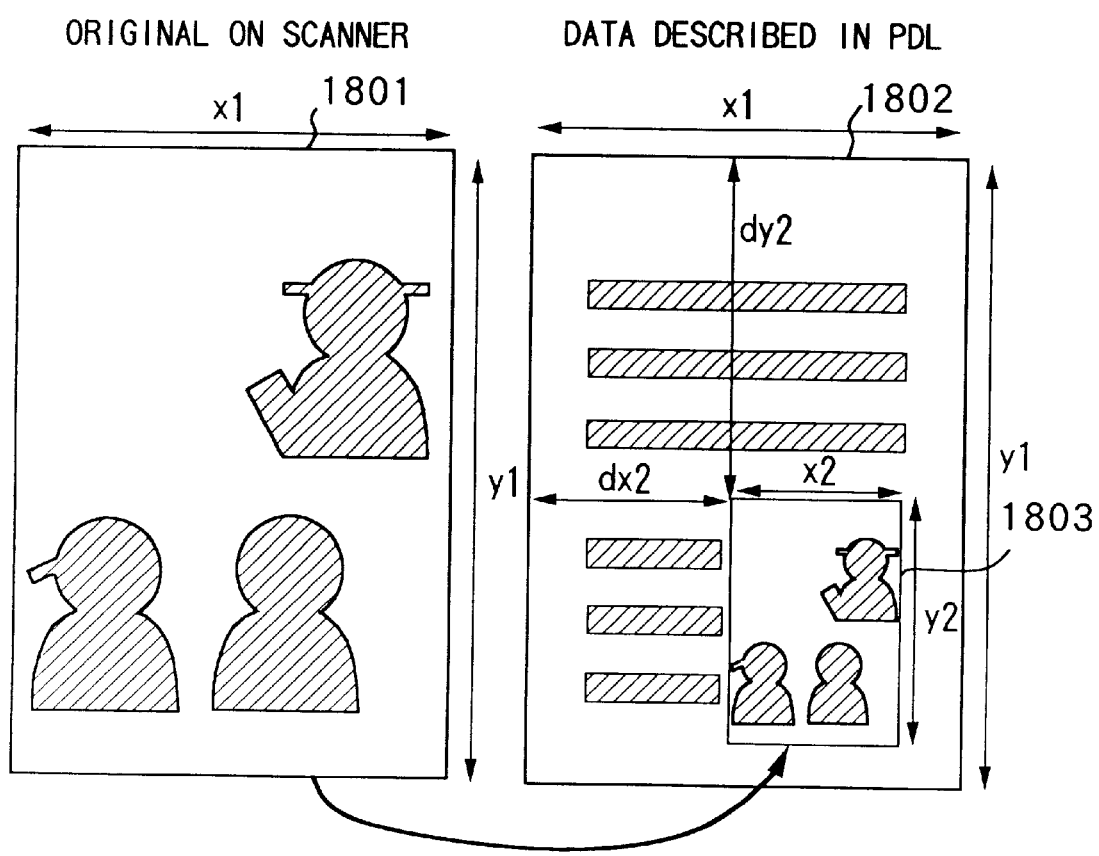
FIG. 18 shows an example of an image synthesized in the sixth embodiment.

In the third and fourth embodiments, the size of the selection region is determined in correspondence with that of the insertion region, and cannot be changed by the operator. However, in this embodiment, in step S1008 in FIG. 10 and step S1606 in FIG. 16, not only the position of the selection region but also its size can be changed. FIG. 18 shows an example in which the size has been automatically changed. In case of FIG. 18, the selection region on scan data corresponds to a whole image 1801. By contrast, an insertion region 1803 defined on PDL data 1802 is smaller than that selection region. In such case, the image 1801 is reduced in size, and is synthesized into the insertion region 1803. For this purpose, in step S1014 in FIG. 10 and step S1612 in FIG. 16, a command for enlarging/reducing in size an image in the selection region of scan data in correspondence with the size of the insertion region is inserted in the PDL data. The printer 1000 interprets this command to enlarge/reduce the scan data in size, and synthesize it with the PDL data.

As described above, when this embodiment is used, the user can be informed of different region sizes of the scan data and PDL data by means of an error or warning message, and can take an appropriate measure.

Also, since the scan data can be automatically enlarged/reduced in size to adjust the size of an image within the selection region to that of the insertion region, the scan data need not be enlarged/reduced in size in advance.

[Various Modifications]

In each of the above embodiments, the resolution of the scanner is pre-set in PDL data. Alternatively, the scanner controller 208 may inquire of the control panel 1012 as to the printer resolution, and may scan data via the scanner 202 at a resolution input as a result of the inquiry. If scanning cannot be done at the obtained resolution, data is scanned by the scanner 202 at a resolution closest to the obtained one.

In each of the above embodiments, the insertion region is designated in advance in PDL data. In some cases, some data may already be present in the designated PDL data. In such case, whether priority is given to PDL data or scan data may be designated from the control panel 1012 or host computer 201.

Figure 19:
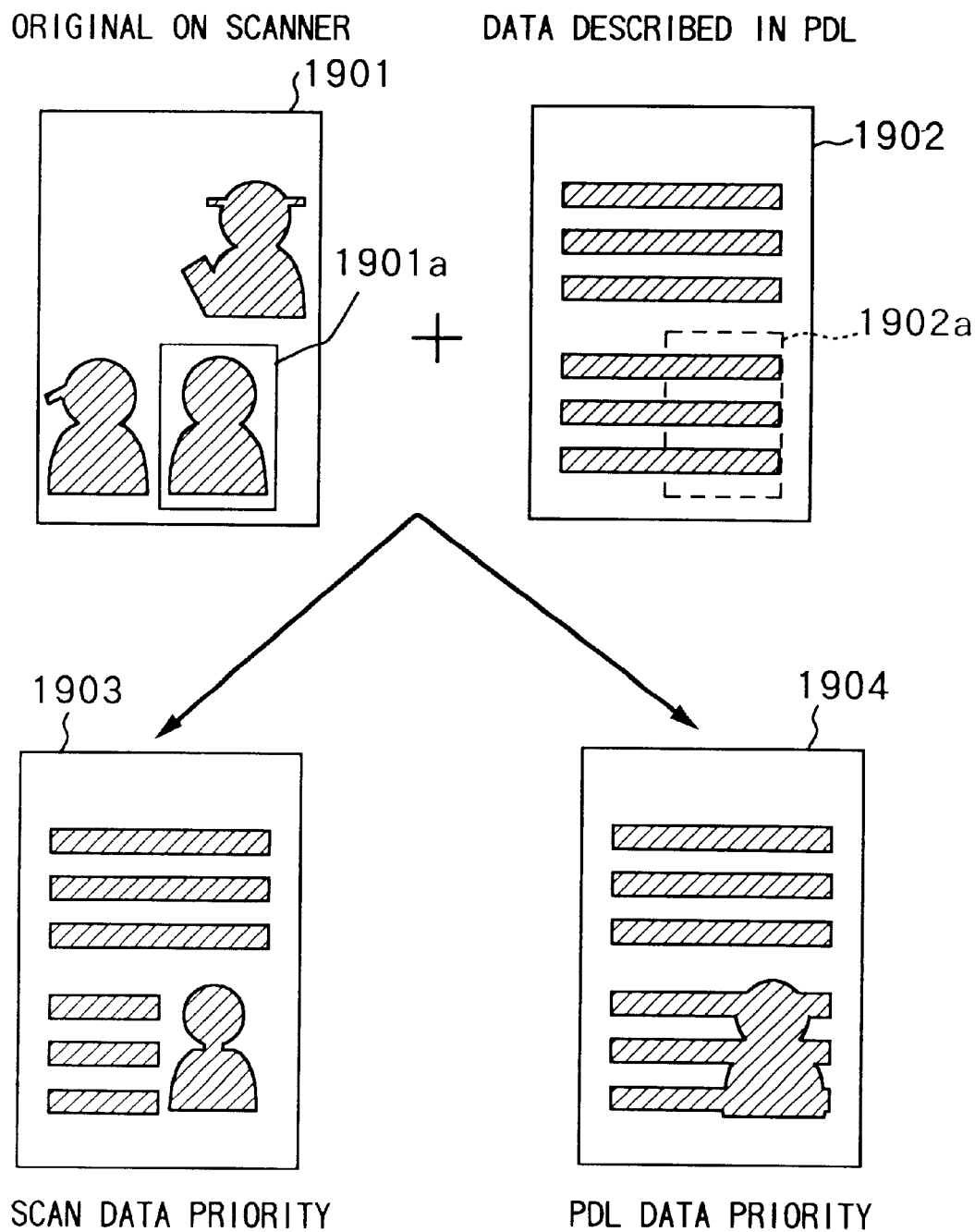
FIG. 19 shows examples of images when priority is given to different images to be synthesized.

FIG. 19 exemplifies data to be synthesized according to this embodiment. Assume that a selection region 1901*a* in scanner data 1901 is synthesized with an insertion region 1902*a* in PDL data 1902. In such case, since priority is given to scan data, i.e., PDL data is developed as dot image data, and scan data is superposed thereon, an image 1903 is obtained. To obtain such image, in case of FIG. 14, PDL data developing in step S1405 may be executed not after step S1409 but between steps S1402 and S1403.

Since the third and fourth embodiments are designed to give priority to PDL data, PDL data can be developed after mapping scan data, as shown in FIG. 14.

To select such priority modes, a flag which changes its value in accordance with operator's operation or an instruction from the host computer may be assigned. If the value of that flag is "1", the processing may be done according to FIG. 14; if the value of the flag is "0", PDL data development in step S1405 can be executed not after step S1409 but between steps S1402 and S1403.

Figure 20:
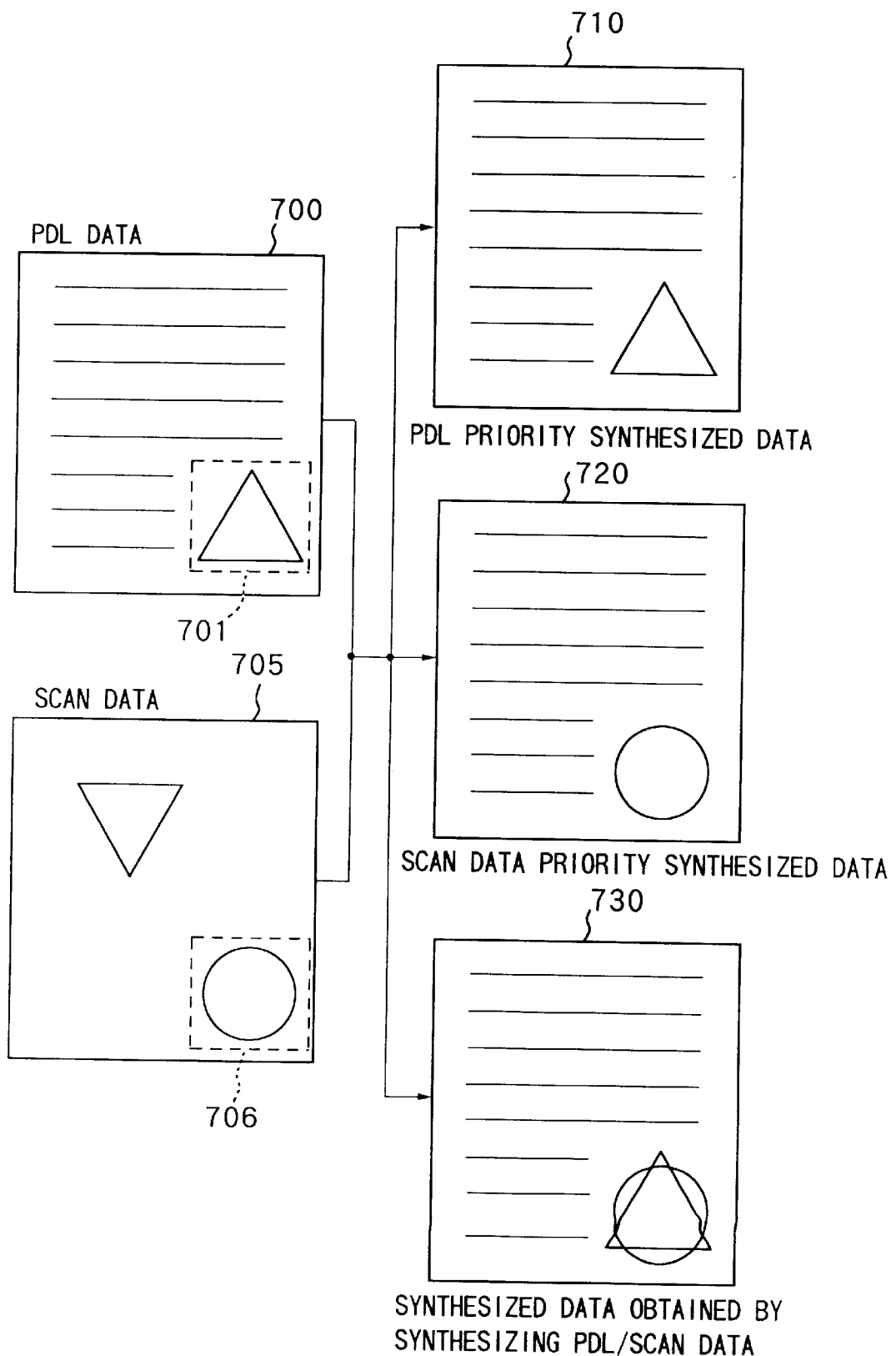
FIG. 20 shows examples of images when priority is given to different images to be synthesized.

Furthermore, priority may be given to neither data, and overlapping images may be overlaid with each other. FIG. 20 shows an example wherein PDL data 700 and scan data 705 are synthesized. If priority is given to scan data, an image which is already present in an insertion region 701 of the PDL data is output like an image 720. If priority is given to PDL data, an image within a selection region 706 of the scan data is output like an image 710. If synthesis is selected, both the images are overlaid and output like an image 730. In this last method, the user may designate an arithmetic operation for overlying two images. For example, corresponding pixel values may be added to each other, or in case of a binary image, an OR, EX-OR, and the like may be selected. In this way, even when PDL data already exists in the region of PDL data in which scan data is to be inserted, they can be adjusted on the printing apparatus.

In the above embodiments, synthesis between the scan data and PDL data has been exemplified. Even when data to be synthesized is image data other than scan data, this embodiment can be applied.

In the above-mentioned embodiments, the independent printer and scanner build the system. However, the image synthesis technique described in the above embodiment may be applied to a system in which a digital copying machine which includes a scanner and printer and can be used as a copying machine, facsimile apparatus, or a scanner or printer alone, is connected to a host computer.

[Another Embodiment]

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, scan data can be automatically read in accordance with PDL data, and the printing apparatus can synthesize the PDL data and scan data. Hence, the scanner need not transfer scan data to the host computer or vice versa. For this reason, the communication traffic on the network can be reduced.

Since the host computer need not synthesize images, its resources can be effectively used.

Since a command for synthesizing scan data is supplied to the printer as a part of PDL commands, synthesis of scan data can be instructed with respect to a desired page.

Since the insertion region is accurately designated by PDL data, even when scan data contains an image which is not required in data synthesis, the required scan data alone can be synthesized with the PDL data.

A region of scan data that the user desired and scan data can be synthesized and printed. The region of scan data is designated by moving a frame with a size corresponding to the region designated by the PDL data on the preview window. For this reason, a desired region can be designated very easily.

The selection region can be freely set in scan data on the screen of the host computer. Since the user can set the region while observing the previewed scan data, his or her desired partial image can be accurately selected, and the selected portion can be synthesized with an image such as a document or the like expressed by PDL data.

Even when the scan data is previewed, the scan data need not be transmitted from the host computer to the printer. For this reason, image data sent onto the network is very small, and does not increase any communication traffic.

Furthermore, if the operator does not select any selection region, a region on the scan data corresponding to the insertion region is selected as the selection region. For this reason, the operator may skip determination of the position of the selection region.

Before printing, the user can be informed of different region sizes of scan data and PDL data used in synthesis by means of an error or warning message, and can take an appropriate measure.

Since scan data can be automatically enlarged/reduced in size to adjust the size of an image within the selection region to that of the insertion region, the scan data need not be enlarged/reduced in advance.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus comprising:
determination means for determining whether print data transmitted from an external apparatus includes a command for instructing capture of image data and synthesis between an image based on the print data and an image based on the image data;
capture means for capturing image data when said determination means determines that the print data includes the command;
transmission means for transmitting data to the external apparatus to display the image based on the image data captured by said capture means;
reception means receiving a designation from the external apparatus; and
synthesis means for synthesizing the image based on the image data captured by said capture means with the image based on the print data in accordance with the designation received by said reception means.

2. The apparatus according to claim 1, wherein the command includes a command for designating an insertion region of the captured image data in a page.

3. The apparatus according to claim 1,
wherein said reception means receives selection region information indicating a portion to be synthesized in the image data from the external apparatus, and
wherein said synthesis means synthesizes an image based on image data included in a selection region indicated by the selection region information, with the image based on the print data.

4. The apparatus according to claim 3, further comprising:
comparison means for comparing sizes of the insertion region indicated by the print data and the selection region indicated by the selection region information; and
informing means for informing a user of a determination result provided by said comparison means when said comparison means determines different sizes.

5. The apparatus according to claim 3, further comprising:
comparison means for comparing sizes of the insertion region indicated by the print data and the selection region indicated by the selection region information; and
means for stopping operation of said printing apparatus when said comparison means determines different sizes.

6. The apparatus according to claim 3, further comprising:
comparison means for comparing sizes of the insertion region indicated by the print data and the selection region indicated by the selection region information; and
variable magnification means for adjusting the size of image data present in the selection region to the size of the insertion region by enlarging or reducing the image data in size, when said comparison means determines different sizes.

7. The apparatus according to claim 3, further comprising selection means for, when data is already present in the insertion region, selecting whether priority is given to image data in the insertion region or image data in the selection region.

8. The apparatus according to claim 1, further comprising setting means for setting a resolution upon capturing image data by said capture means.

9. The apparatus according to claim 1, wherein the image data includes image data transmitted from a scanner.

10. An information processing apparatus connected to a printing apparatus which can capture image data via a scanner, comprising:
data transmission means for transmitting print data including a command, which instructs capture of image data and designates an insertion region of the image data, to the printing apparatus;
reception means for receiving data for displaying an image based on image data is captured by the printing apparatus via the scanner in accordance with the command, from the printing apparatus;
display means for displaying the image based on the data received by said reception means;

image data designation means for designating an image to be inserted into the insertion region, on the basis of the image displayed by said display means; and transmission means for transmitting a designation result of said image data designation means to the printing apparatus.

11. The apparatus according to claim 10, wherein the data received by said reception means includes image data whose resolution is dropped by the printing apparatus.

12. The apparatus according to claim 10, wherein said reception means receives image data whose resolution is dropped by said information processing apparatus.

13. The apparatus according to claim 10, wherein said display means displays a frame having a size corresponding to the insertion region on an image based on the received data, moves the frame in accordance with the designation by said image data designation means, and transmits a position and size of the frame to said printing apparatus as a region of image data to be inserted in the insertion region via said transmission means.

14. An information processing method for an apparatus connected to a printing apparatus which can capture image data via a scanner, comprising:

a data transmission step, of transmitting print data including a command, which instructs capture of image data and designates an insertion region of the image data, to the printing apparatus;

a reception step, of receiving data for displaying an image based on image data is captured by the printing apparatus via the scanner in response to the command, from the printing apparatus;

a display step, of displaying the image based on the data received in the reception step;

an image data designation step, of designating an image to be inserted into the insertion region, on the basis of the image displayed in the display step; and a transmission step, of transmitting a designation result in the image data designation step to the printing apparatus.

15. The method according to claim 14, wherein the data received in the reception step includes image data whose resolution is dropped by the printing apparatus.

16. The method according to claim 14, wherein the reception step includes the step of receiving image data whose resolution is dropped.

17. The method according to claim 14, wherein the display step includes the step of displaying a frame having a size corresponding to the insertion region on an image based on the received data, moving the frame in accordance with the designation in the image data designation step, and transmitting a position and size of the frame to said printing apparatus as a region of image data to be inserted in the insertion region via the transmission step.

18. A computer readable memory storing a program which can be executed by a computer, said program including:

a data transmission step, of transmitting print data including a command, which instructs capture of image data and designates an insertion region of the image data, to a printing apparatus;

a reception step, of receiving data for displaying an image based on image data is captured by the printing apparatus via the scanner in accordance with the command, from the printing apparatus;

a display step, of displaying the image based on the data received in the reception step;

an image data designation step, of designating an image to be inserted into the insertion region, on the basis of the image displayed in the display step; and a transmission step, of transmitting a designation result in the image data designation step to the printing apparatus.

19. The memory according to claim 18, wherein the data received in the reception step includes image data whose resolution is dropped by the printing apparatus.

20. The memory according to claim 18, wherein the reception step includes the step of receiving image data whose resolution is dropped.

21. The memory according to claim 18, wherein the display step includes the step of displaying a frame having a size corresponding to the insertion region on an image based on the received data, moving the frame in accordance with the designation in the image data designation step, and transmitting a position and size of the frame to the printing apparatus as a region of image data to be inserted in the insertion region via the transmission step.

22. A printing method comprising:

a determination step, of determining whether print data transmitted from an external apparatus includes a command for instructing capture of image data and synthesis between an image based on the print data and an image based on the image data;

a capture step, of capturing image data when it is determined in said determination step that the print data includes the command;

a transmission step, of transmitting data to the external apparatus to display the image based on the image data captured in said capture step;

a reception step, of receiving a designation from the external apparatus; and a synthesis step, of synthesizing the image based on the image data captured in said capture step with the image based on the print data in accordance with the designation received in said reception step.

23. The method according to claim 22, wherein the command includes a command for designating an insertion region of the captured image data in a page.

24. The method according to claim 22, wherein said reception step includes receiving selection region information indicating a portion to be synthesized in the image data from the external apparatus, and said synthesis step includes synthesizing an image based on image data included in a selection region indicated by the selection region information, with the image based on the print data.

25. The method according to claim 24, further comprising:

comparison step, of comparing sizes of the insertion region indicated by the print data and the selection region indicated by the selection region information; and an informing step, of informing a user of a determination result obtained in said comparison step when said comparison step determines different sizes.

26. The method according to claim 24, further comprising:

a comparison step, of comparing sizes of the insertion region indicated by the print data and the selection region indicated by the selection region information; and a step of stopping operation of the printing apparatus when said comparison step determines different sizes.

27. The method according to claim 24, further comprising:
- a comparison step, of comparing sizes of the insertion region indicated by the print data and the selection region indicated by the selection region information; and
- a variable magnification step, of adjusting the size of image data present in the selection region to the size of the insertion region by enlarging or reducing the image data in size, when said comparison step determines different sizes.

28. The method according to claim 24, further comprising a selection step of, when data is already present in the insertion region, selecting whether priority is given to image data in the insertion region or image data in the selection region.

29. The method according to claim 22, further comprising a setting step, of setting a resolution upon capturing image data in said capture step.

30. The method according to claim 22, wherein the image data includes image data transmitted from a scanner.

* * * * *